United States Patent
Hetzler et al.

(10) Patent No.: US 9,069,473 B2
(45) Date of Patent: Jun. 30, 2015

(54) WAIT-FREE STREAM ORIENTED MIGRATION BASED STORAGE

(75) Inventors: Steven Robert Hetzler, San Jose, CA (US); Mario H. Lichtsinn, San Jose, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 13/015,015

(22) Filed: Jan. 27, 2011

(65) Prior Publication Data

US 2012/0198027 A1 Aug. 2, 2012

(51) Int. Cl.
*G06F 15/16* (2006.01)
*G06F 3/06* (2006.01)

(52) U.S. Cl.
CPC ............ *G06F 3/0617* (2013.01); *G06F 3/0647* (2013.01); *G06F 3/067* (2013.01)

(58) Field of Classification Search
CPC ...... G06F 3/0617; G06F 3/067; G06F 3/0647
USPC .......................................... 709/217, 218, 219
See application file for complete search history.

(56) References Cited

U.S. PATENT DOCUMENTS

| | | | |
|---|---|---|---|
| 5,758,118 A | 5/1998 | Choy et al. | |
| 5,991,804 A | 11/1999 | Bolosky et al. | |
| 6,035,374 A | 3/2000 | Panwar et al. | |
| 6,304,941 B1 | 10/2001 | Lyons et al. | |
| 6,347,359 B1 | 2/2002 | Smith et al. | |
| 6,598,134 B2 * | 7/2003 | Ofek et al. | 711/162 |
| 6,901,479 B2 | 5/2005 | Tomita | |
| 7,111,117 B2 | 9/2006 | Franklin et al. | |
| 7,490,207 B2 | 2/2009 | Amarendran et al. | |
| 7,548,898 B1 | 6/2009 | Tarenskeen et al. | |
| 7,685,129 B1 | 3/2010 | LeCrone et al. | |
| 7,757,055 B2 * | 7/2010 | Tsukada et al. | 711/161 |
| 8,055,724 B2 * | 11/2011 | Amegadzie et al. | 709/217 |
| 2002/0174419 A1 * | 11/2002 | Alvarez et al. | 717/168 |
| 2003/0145167 A1 | 7/2003 | Tomita | |
| 2004/0205166 A1 | 10/2004 | DeMoney | |
| 2006/0075290 A1 | 4/2006 | Hartline et al. | |
| 2006/0107097 A1 | 5/2006 | Zohar et al. | |
| 2006/0212671 A1 * | 9/2006 | Todd | 711/165 |
| 2008/0080526 A1 | 4/2008 | Gounares et al. | |
| 2008/0082693 A1 | 4/2008 | Meijer et al. | |
| 2008/0222375 A1 * | 9/2008 | Kotsovinos et al. | 711/162 |
| 2008/0276041 A1 | 11/2008 | Hetzler | |

(Continued)

OTHER PUBLICATIONS

Greiner, A. et al., "A Generic Hardware / Software Communication Middleware for Streaming Applications on Shared Memory Multi Processor System-on-Chip," IEEE, Forum on Specification & Design Languages, 1-4, Sep. 22-24, 2009.

(Continued)

*Primary Examiner* — Joseph Greene
(74) *Attorney, Agent, or Firm* — Lieberman & Brandsdorfer, LLC

(57) ABSTRACT

Embodiments of the invention relate to systematic migration of data. Data is streamed to data storage and stored in a virtual storage device (VSD). Stored data is systematically migrated from the VSD to a higher density VSD, while streaming of data is also switched to the higher density VSD. Source and target data extents are maintained and merged upon completion of the data migration, together with linking the streamed data blocks with the migrated data blocks in the order presented in the input stream.

19 Claims, 25 Drawing Sheets

(56) References Cited

U.S. PATENT DOCUMENTS

| | | |
|---|---|---|
| 2008/0276057 A1 | 11/2008 | Hetzler |
| 2009/0089781 A1 | 4/2009 | Shingai et al. |
| 2009/0171999 A1 | 7/2009 | McColl et al. |
| 2009/0265567 A1* | 10/2009 | Nguyen et al. ............... 713/320 |
| 2009/0265706 A1 | 10/2009 | Golosovker et al. |
| 2009/0276771 A1 | 11/2009 | Nickolov et al. |
| 2010/0169287 A1 | 7/2010 | Klose |

OTHER PUBLICATIONS

Hu, Y. et al., "On Media Streaming Application Migration in Pervasive Environment," Proceedings of the 1st Asia-Pacific Symposium on InternetWare, ACM, Mar. 2006.

Hirofuchi et al., "A Live Storage Migration Mechanism Over WAN for Relocatable Virtual Machine Services on Clouds," 9th IEEE/ACM International Symposium on Cluster Computing and the Grid, 2009, pp. 460-465.

Bradford et al., "Live Wide-Area Migration of Virtual Machines Including Local Persistent State," Proceedings of the 3rd International Conference on Virtual Execution Environments, 2007, pp. 169-179.

Ramakrishnan et al., "Live Data Center Migration Across WANs: A Robust Cooperative Context Aware Approach," Proceedings of the 2007 SIGCOMM Workshop on Internet Network Management, Aug. 27-31, 2007.

Bellavista, P. et al., Proactive Management of Distributed Buffers for Streaming Continuity in Wired-Wireless Integrated Networks, 10th IEEE/IFIP Network Operations and Management Symposium, NOMS, pp. 351-360, Dec. 1, 2006.

Sobolewski, M. et al., "Federated Grid Computing With Interactive Service-Oriented Programming," Concurrent Engineering 2006, pp. 55-66, Mar. 2006.

Sapuntzakis et al., "Optimizing the Migration of Virtual Computers," ACM SIGOPS Operating Systems Review, vol. 36, Issue SI, OSDI '02: Proceedings of the 5th Symposium on Operating Systems Design and Implementation, pp. 377-390, 2002.

Rudolph et al., "A Simple Load Balancing Scheme for Task Allocation in Parallel Machines," ACM, pp. 237-245, 1991.

* cited by examiner

WAIT-FREE STREAM ORIENTED MIGRATION BASED STORAGE

CROSS REFERENCE TO RELATED APPLICATION(S)

This application is related to the application Ser. No. 13/015,282, entitled "A Transactional Independent Persister Cloning System," that is to be filed on the same day as the present application.

BACKGROUND

This invention relates to data storage in a computer system environment. More specifically, the invention relates to systematic migration of data in back end storage while streaming data from a data source.

A data storage block or a storage block, herein after referred to as a block, refers to specific areas of address space on a storage device; a data chunk is a term used to describe a unit of information that contains data or data segments. For example, one data block may be a collection of sectors or bytes in an area of disk space. Blocks or chunks are manipulated as units. Large allocations or blocks or chunks allow a large amount of data to be retrieved in a single I/O transaction. In one embodiment, a block is a fixed-size unit of data that is transferred together, and a data chunk is a variable size unit of data. A file system is a collection of file data maintained by an implementation that stores, organizes, and maintains file data in a file and/or directory hierarchy. File systems employ techniques to write data to storage media using block allocation techniques. Typically, a storage system provides access to information that is stored on one or more storage devices connected to the storage system. Access to the information is possible by organizing the storage devices into volumes, which logically organize the information stored on the storage devices.

The storage system may be further configured to operate according to a client/server model of information delivery to thereby allow many clients to access data containers stored on the system. In this model, the client may employ an application, such as a database application, executing on a computer that connects to the storage system over a computer network. Each client may request the services of the storage system by issuing file-based protocol messages to the system over the network. A plurality of storage systems may be interconnected to provide a storage system environment configured to service many clients. Each storage system may be configured to service one or more volumes, wherein each volume stores one or more data containers.

BRIEF SUMMARY

This invention comprises a method, system, and article for managing an input data stream to support transmission of the data to data storage.

In one aspect of the invention, a method is provided for managing streaming of data. At least two virtual storage devices (VSDs) are organized in a first orbit. The organization and order of the VSDs is based upon their respective storage densities. An input stream of data is streamed from a source to a first VSD in the first orbit, where the streamed data is stored. The streaming of data takes place in an uninterrupted manner. During transmission of the streaming data, the target of the transmission is changed from a first VSD to a second VSD in such a way that the source of the data stream need not pause in its sending of data. This wait free condition is accomplished by synchronizing messages among various components. After the change of the target VSD designation, transmission continues uninterrupted while data previously stored in the first target VSD is concurrently migrated to the second target VSD. To support migration, a source data extent is maintained at the first target VSD, and a receiving data extent is maintained at the second target VSD. To support transmission a target data extent is maintained at the second target VSD. Upon completion of the data migration, the input stream of data is merged with the migrated data in the second VSD. The process of merging includes linking a final block of the data extent for receiving data from the first VSD with a first block of the target data extent at the second VSD.

In another aspect of the invention, a computer system is provided with two or more virtual storage devices (VSDs) organized in a first orbit, with the VSD organization within the orbit placed in order of storage density. A transmission manager is provided to stream an input stream of data from a source to a first VSD in the first orbit, and to store the streamed data in the first VSD. The transmission manager streams the data in an uninterrupted manner. A migration manager is provided in communication with the transmission manager. More specifically, the migration manager synchronizes migration of the input stream of data from the first VSD to the second VSD, both devices in the first orbit. The migration manager replaces the first VSD by the second VSD as a target of the transmitted stream of data while concurrently migrating data from the first VSD to the second VSD. A data extent manager is provided in communication with the migration manager and the transmission manager. More specifically, the data extent manager maintains a source data extent at the first VSD and maintains separate receiving and target data extents at the second VSD. A merge manager is provided in communication with the data extent manager, with the merge manager configured to merge the input stream with the migrated data in the second VSD upon completion of the data migration. More specifically, the merge manager links a final block of the receiving data extent of the second VSD with a first block of the target data extent at the second VSD.

In yet another aspect of the invention, a computer program product is provided with a computer readable storage medium having embodied computer readable program code. More specifically, computer readable program code is provided to stream data from an input stream in an uninterrupted manner from a source to a first VSD in a first orbit, with the first orbit having at least two VSDs in the first orbit organized in order of storage density. The streamed data is stored in the first VSD. Computer readable program code is provided to change the target of transmission of the input stream of data from the first VSD to a second VSD in the first orbit. As part of the change of target, the second VSD replaces the first VSD for receipt of the input stream of data while data stored on the first VSD is migrated to the second VSD. Computer readable program code is also provided to maintain a source data extent local to the first VSD and to provide separate receiving and target data extents local to the second VSD. In addition, computer readable program code is provided to link a final block of the receiving data extent of the second VSD with a first block of the target data extent local to the second VSD.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustra

DETAILED DESCRIPTION

Figure 1:
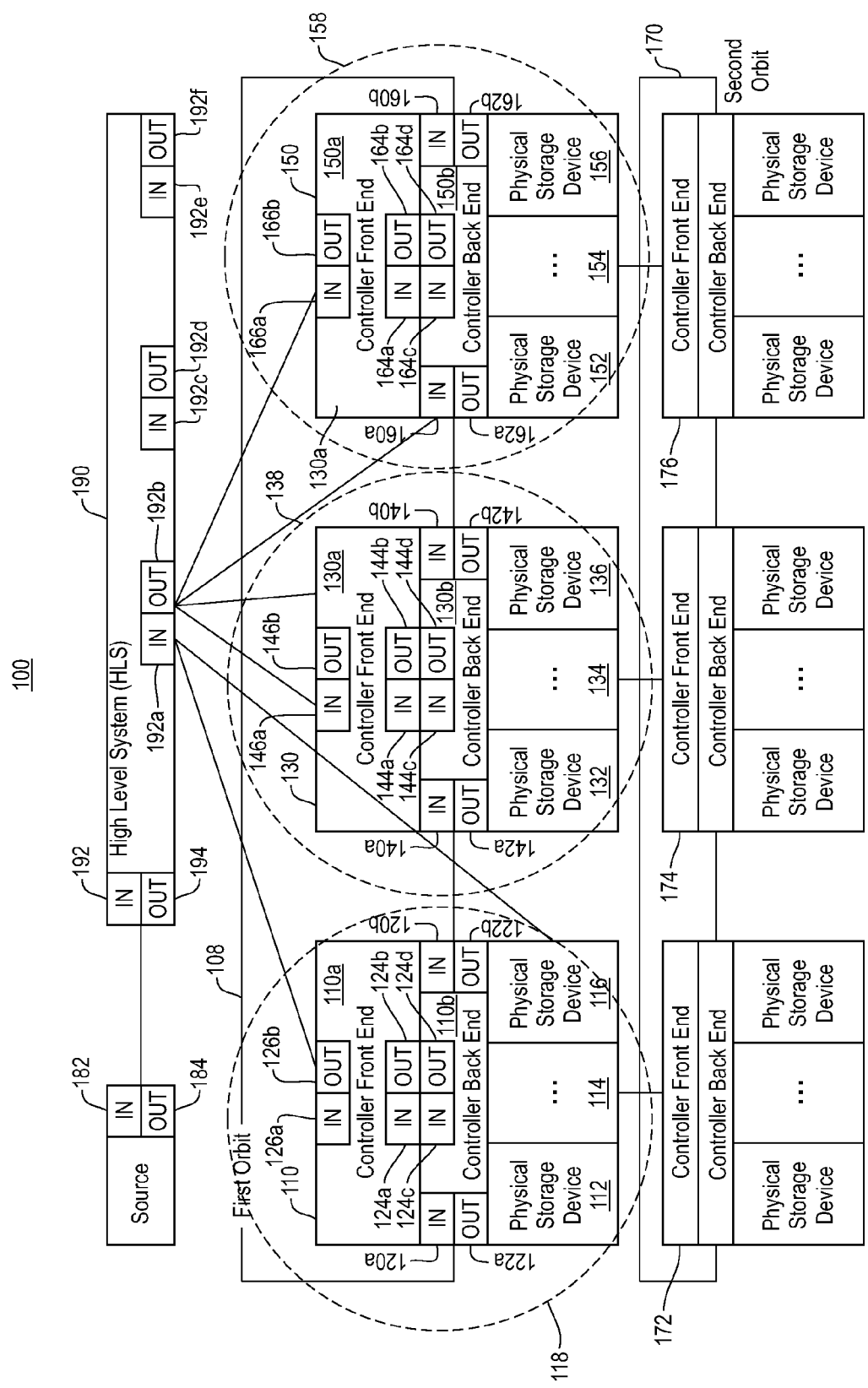
- FIG. 1 is a block diagram of a network of VSDs arranged in a multi-dimensional array.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. One or more managers may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment. Reference throughout this specification to "virtual storage device" (VSD) means a component comprising a controller and one or more physical storage devices organized in such a way as to present an interface that treats the storage as a contiguous address space of blocks. Similarly, reference throughout this specification to "transmission" means the streaming of data from a source to a VSD. Reference throughout this specification to "target" means the VSD that receives the transmission. Reference throughout this specification to "migration" means the movement of data previously stored in one VSD to another VSD.

Furthermore, the described features, structures, or characteristics may be combined in any suitable manner in one or more embodiments. In the following description, numerous specific details are provided, such as examples of a transmission manager, a migration manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

It is known in the art that storage devices may be arranged in a network to support both data redundancy and access. Redundancy is employed to ensure access to the data in the event of failure. Access is provided to ensure access to the data by two or more servers. There are different configurations of data storage to support both redundancy and access, including, but not limited to, a storage area network (SAN) and a Redundant Array of Independent Disks (RAID). In an embodiment that supports use of commodity storage devices, the RAID may be the more desirable configuration. Similarly, in an embodiment that does not use commodity storage devices; a SAN may be a desirable configuration. Accordingly, a selection of a data storage configuration may be based upon the needs of the computer system it is designed to support as well as the back end storage devices.

FIG. 1 is a block diagram (100) of a network of storage devices and direct communication paths arranged in a multi-dimensional array. As shown, the storage array has a hierarchical configuration with multiple tiers. In a first tier, commodity storage devices are shown in communication with a controller, which is at a second tier. In a tree structure configuration, the commodity storage devices are comparable to a set of external nodes, with the controllers being the parent nodes. In one embodiment, the commodity storage devices are referred to as back end storage. The combination of controller and commodity or physical storage devices is called a virtual storage device (VSD).

The second tier shows three VSDs (110), (130), and (150), with each VSD supporting a plurality of commodity storage devices. VSD (110) is shown supporting commodity storage devices (112), (114), and (116); VSD (130) is shown supporting commodity storage devices (132), (134), and (136); and VSD (150) is shown supporting commodity storage devices (152), (154), and (156). In one embodiment, the individual VSDs (110), (130), and (150) may be configured to support a larger or smaller quantity of storage devices. Accordingly, the invention should not be limited to the quantity of storage devices shown herein. Each set of commodity storage devices, together with its VSD is treated as a single VSD. Commodity storage devices (112), (114), and (116) are a part of a first VSD (118); commodity storage devices (132), (134), and (136) are a part of a second VSD (138); and commodity storage devices (152), (154), and (156) are a part of a third VSD (158). The three VSD, (118), (138), (158), are arranged in a first orbit (108), which is a one dimensional closed loop communication path consisting of VSDs and communication links. The VSDs (118), (138), and (158) are arranged in the first orbit (108) in order of increasing storage density, the storage density of a VSD being the average storage density of its commodity storage device members. Accordingly, each VSD supports a plurality of commodity storage devices treated as a single VSD.

Each of the VSDs (110), (130), and (150) are divided into a front end and a back end. The front end of the VSDs supports communication from the VSD to a high level system (HLS) (190). In one embodiment, the HLS (190) is a general manager for the storage system comprising a software system implemented on one or more processors and presenting a communication interface to users of the storage system. The back end of the VSDs supports inter-VSD communication (via the orbit) as well as communication within the VSD. As shown, VSD (110) has a front end (110a) and a back end (110b); VSD (130) has a front end (130a) and a back end (130b); and VSD (150) has a front end (150a) and a back end (150b).

The front end and the back end of each VSD are each provided with multiple queues and associated threads to manage the respective queues. The use of separate threads avoids waiting during data transmission and migration protocols, as is disclosed below in detail. Queues are provided at the back end to support inter-VSD communication along the orbit, and queues are provided at the front end to support communication between the VSD and the HLS (190). More specifically, the back end of each VSD is provided with a set of back end queues, including an input queue and an output queue. As shown, the VSD back end (110b) has input queues (120a) and (120b) and output queues (122a) and (122b); VSD (130) has input queues (140a) and (140b) and output queues (142a) and (142b); and VSD (150) has input queues (160a) and (160b) and output queues (162a) and (162b). The input queue of the back end of one VSD communicates with an output queue of the back end of another VSD within the hierarchical structure. As shown, the input queue (120b) is in communication with the output queue (142a), the input queue (140a) is in communication with the output queue (122b); the input queue (140b) is in communication with the output queue (160b); the input queue (160a) is in communication with the output queue (142b); the input queue (160b) is in communication with the output queue (122a); and the input queue (120a) is in communication with the output queue (162b). Each of these queues and respective threads function to manage migration of data in an orbit.

The front end of each of the VSDs (110), (130), and (150) is configured with a first set of queues to communicate with the HLS (190) and a second set of queues to communicate with the back end. As shown, the front end VSD (110a) has an input queue (124a) and an output (124b) and the back end VSD (110b) has an input queue (124c) and an output queue (124d). Input queue (124a) is in communication with output queue (124d) and input queue (124c) is in communication with output queue (124b). Front end VSD (130a) has an input queue (144a) and an output (144b) and the back end VSD (130b) has an input queue (144c) and an output queue (144d). Input queue (144a) is in communication with output queue (144d) and input queue (144c) is in communication with output queue (144b). Front end VSD (150a) has an input queue (164a) and an output (164b) and the back end VSD (150b) has an input queue (164c) and an output queue (164d). Input queue (164a) is in communication with output queue (164d) and input queue (164c) is in communication with output queue (164b). Each of these queues and respective threads function to manage communication at the VSD level. The queues are one of many possible embodiments of communication support within our invention. All that is required to support both migration and streaming data is a communication mechanism that reliably enforces first-in-first-out communication. In one embodiment, any such communication mechanism may replace the queues shown herein.

As mentioned above, each of the front end VSDs are in communication with the HLS (190). More specifically, the HLS (190) has a set of queues, one input and one output, in communication with a set of queues, one input and one output, of the front end VSD. Front end VSD (110a) has an input queue (126a) and an output queue (126b), front end VSD (130a) has an input queue (146a) and an output queue (146b), and front end VSD (150a) has an input queue (166a) and an output queue (166b). In the example shown herein there are three VSDs, and as such, the HLS has three sets of queues, one set in communication with the respective VSD front ends. More specifically, HLS (190) has a first input queue (192a) and a first output queue (192b), with input queue (192a) in communication with output queue (126b) and output queue (192b) in communication with input queue (126a). HLS (190) also has a second input queue (192c) and a second output queue (192d), with input queue (192c) in communication with output queue (146b) and output queue (192d) in communication with input queue (146a), and a third input queue (192e) and a third output queue (192f), with input queue (192e) in communication with output queue (166b) and output queue (1920 in communication with input queue (166a). Accordingly, a separate set of queues are provided to support communication between the HLS (190) and the respective front ends of each of the VSDs.

The focus is to employ the storage system shown herein to manage an input stream of data, by storing data from the input stream in a back end VSD, and managing migration of the stored data within an orbit of the back end VSD and/or migration of the data on an inter-orbit basis. As shown, the source of the input stream of data (180) is in communication with the HLS (190). More specifically, the source of the input stream of data contains a set of queues, including an input queue (182) and an output queue (184) to communicate with the HLS (190), and the HLS (190) has a set of queues, including an input queue (192) and an output queue (194) to communicate with the source of the input stream (180). Input queue (182) is in communication with output queue (194), and input queue (192) is in communication with output queue (184). In an embodiment that supports multiple input streams, the HLS (190) would be configured with a separate set of input and output queues to communicate with input and output queues of each data stream source, thus separately supporting communication with the respective input streams.

The HLS (190) is configured to provide assignment of an orbit and migration record for the source of an input stream (180). More specifically, the HLS (190) waits on an input stream (180), a VSD, and one or message queues. The migration records form a table of associations, locators, and states, naming streams and linking stream names with high level storage management. The migration record associates each input stream with source, message queues, and with at most one VSD at a time.

FIG. 1 is a high level block diagram showing the hardware components employed in the data migration and the interrelationship among the components. As shown herein, a second orbit (170) is provided in communication with the HLS (190). The second orbit (180) is a part of the second tier in the hierarchy of the first orbit (108). A plurality of VSDs (172), (174), and (176) are shown, with each VSD supporting a plurality of commodity storage devices (not labeled). As described in detail with respect to the first orbit, in the second orbit each set of commodity storage devices, together with its controller is treated as a single VSD and the VSDs of the second orbit (170) are arranged in order of increasing storage density, the storage density of a VSD being the average storage density of its commodity storage device members. Similarly, a set of queues are established within the second orbit (170) and between the second orbit (170) and the HLS (190), in a similar manner to the queues established in the first orbit (108). The queues are provided at the back end of each of the VSDs (172), (174), and (176) to support inter-VSD communication along the orbit (170), and queues are provided at the front end to support communication between the VSD and the HLS (190). Although only two orbits (108) and (170) are shown in the second tier of the hierarchy, the invention should not be limited to the quantity of orbits shown herein. Accordingly, the hierarchy may be expanded to accommodate multiple orbits in the second tier.

Figure 2:
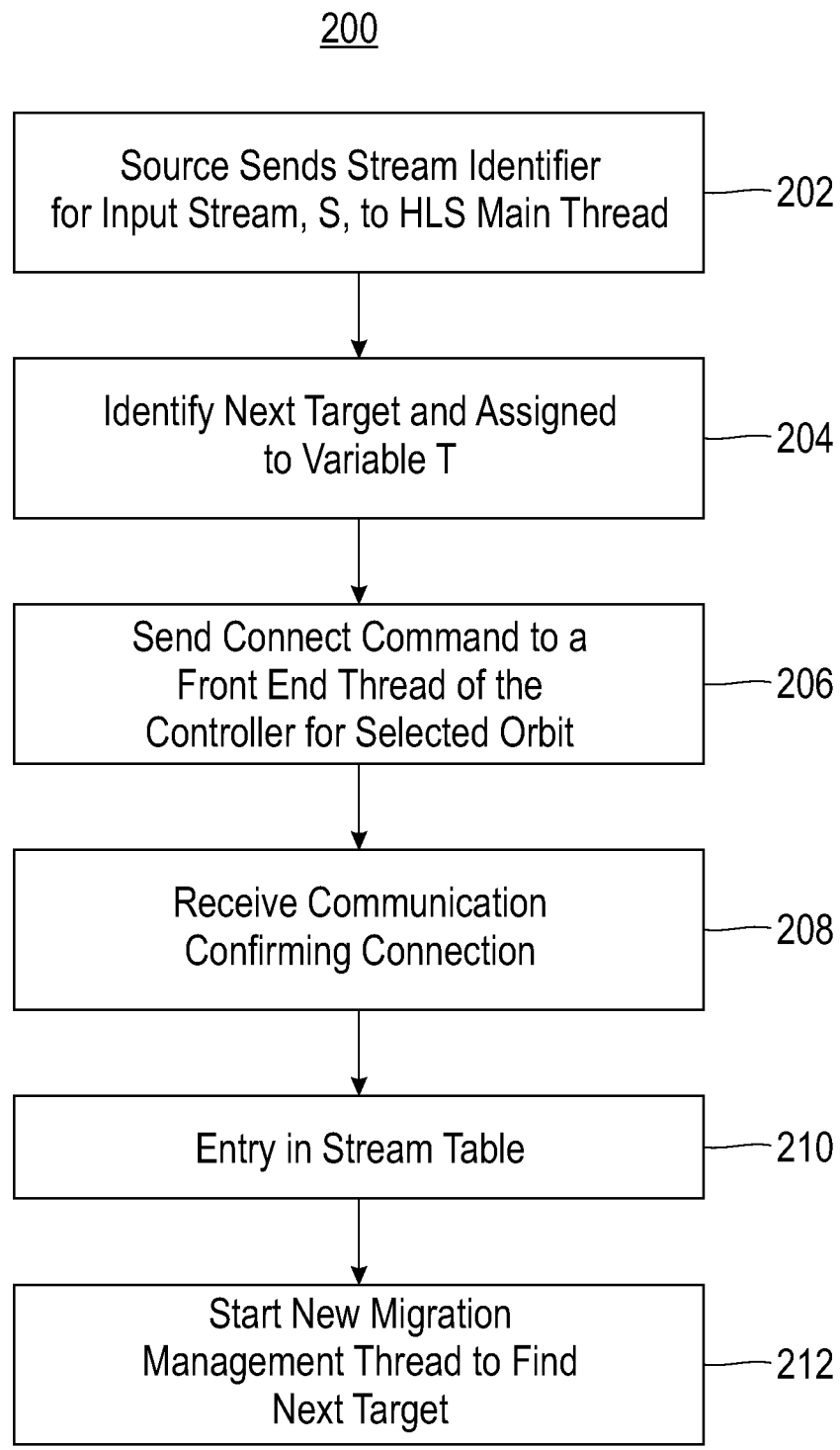
FIG. 2 is a flow chart illustrating functionality of a main thread of the high level system (HLS) to process a new data stream.
Figure 15:
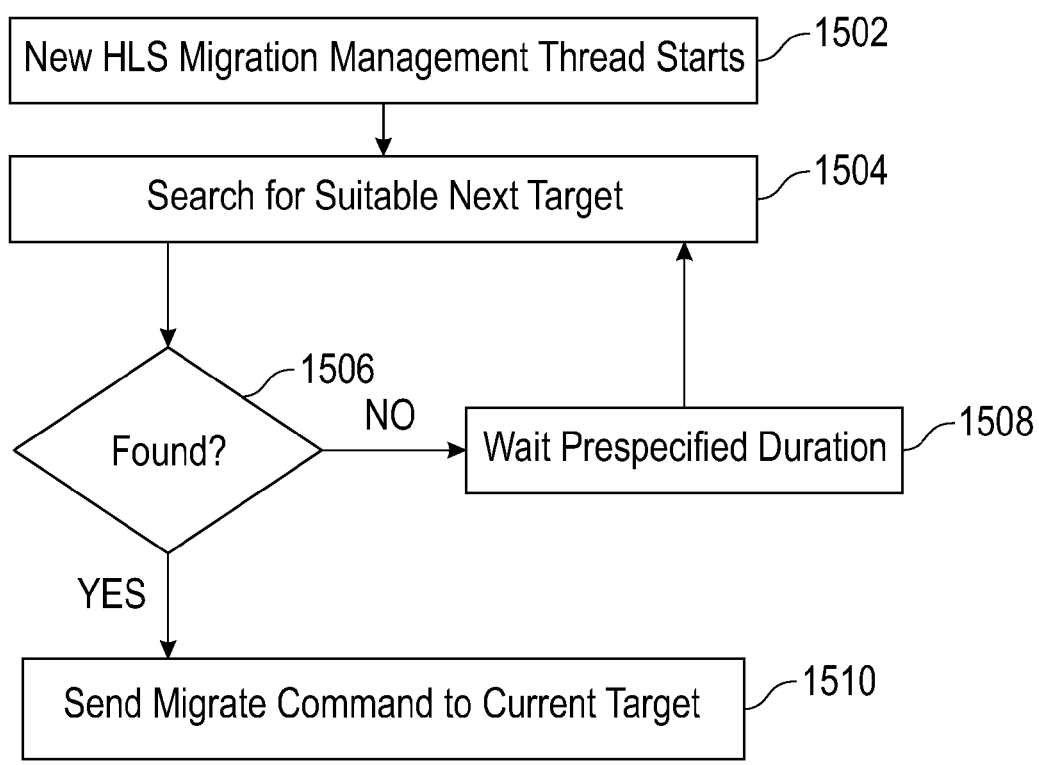
FIG. 15 is a flow chart illustrating functionality of a HLS migration management thread to support data migration.

FIG. 2 is a flow chart (200) illustrating the functionality of a main thread of the HLS (190) to support a new stream of data and associated protocol for migration of the new stream of data to a back end VSD. The source sends a stream identifier for the input stream, S; to the HLS main thread (202). Following receipt of the stream identifier, an orbit and a next available target VSD to receive data from the input stream is identified and assigned to the variable T (204). There are different protocols that may be employed for the assignment at step (204), including, but not limited to, a random assignment, sampling of orbits in communication with the HLS, protocols based on measured bandwidth or capacity of the orbits, etc. Once the orbit and target have been selected, the HLS main thread sends a connect command to a front end thread of the VSD for the selected target (206). In one embodiment, the connect command includes both the stream identifier and an identifier of the selected target. After the connection between the selected VSD front end thread and the HLS has been established, the HLS main thread receives a communication from the selected VSD front end thread that the connection between the selected VSD and the source stream has been established (208). An entry is made in a stream table identifying the input stream with the selected target (210). In one embodiment, the entry at step (210) includes the source identifier, the stream identifier, and target VSD identifier. After the entry at step (210), the entire storage system is prepared to accept streaming input data for this stream. Next the HLS starts a separate migration management thread to manage the migration of the input stream from the current target to a next target in its orbit (212). This thread attempts to find such a suitable next target periodically, until such a target is available as illustrated in FIG. 15. Accordingly, until the next suitable target is available, streaming data will continue to be sent to the current target.

Figure 3:
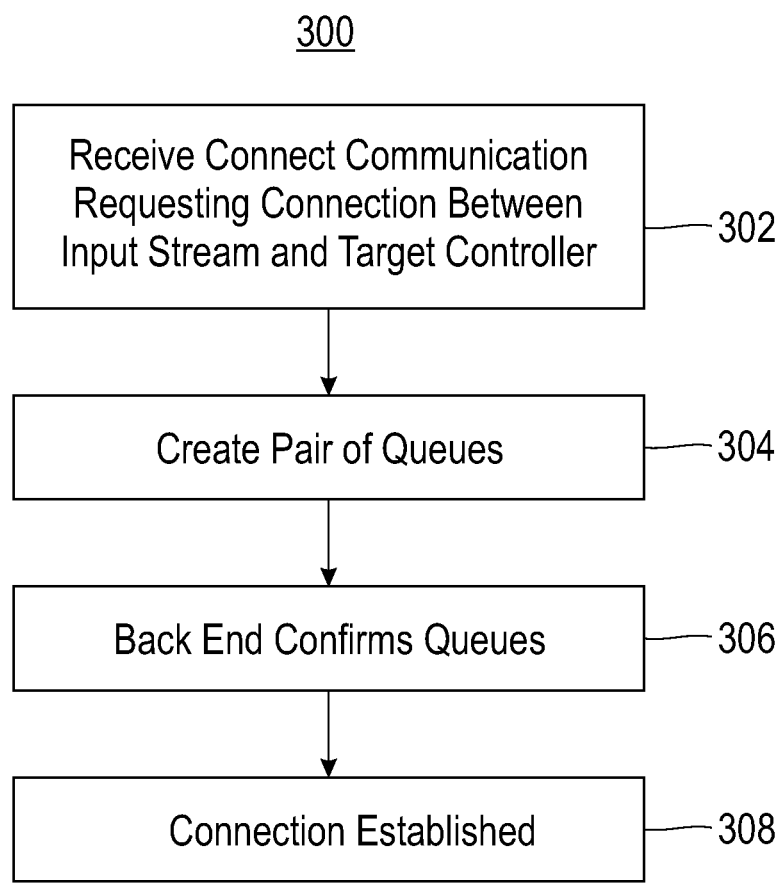
FIG. 3 is a flow chart illustrating functionality of a main thread of a front end VSD to process a new data stream.

As described above, the HLS main thread is in communication with the VSD, and more specifically a front end of the VSD. At the same time, a back end of the VSD is in communication with its VSD. FIG. 3 is a flow chart (300) illustrating the functionality of a front end VSD main thread for a new data stream. The front end main thread receives a connect communication from the HLS main thread requesting a connection between the input stream and the target VSD (302). In one embodiment, the connection communication at step (302) includes an input stream identifier and a target VSD identifier. Following step (302), the front end VSD main thread sends a command to create a pair of queues from the front end of the VSD to the back end of the VSD (304). In one embodiment, the arguments of the command at step (304) include the input stream identifier and the target VSD identifier. Once the queues have been created, a back end thread of the target VSD sends a message that the queues and space for the input stream have been created (306), after which the main front end thread of the target VSD sends a message to the HLS main thread that a connection with the back end of the VSD has been established (308). The communication at step (308) is the acknowledgement message between the target front main thread and the HLS, received by the HLS at step (208). Accordingly, following step (308), streaming of data from the input stream to the back end storage of the selected target can start.

Figure 4:
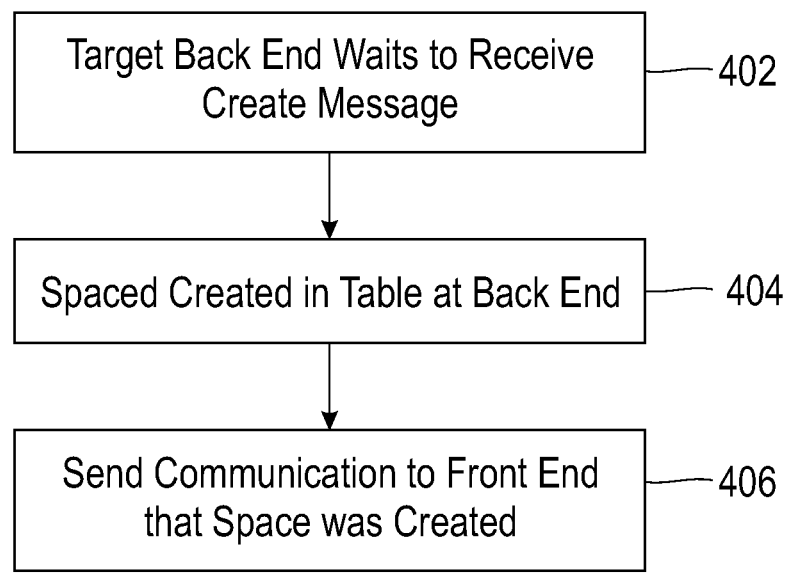
FIG. 4 is a flow chart illustrating functionality of a main thread of a target VSD back end to process a new data stream.

As shown in FIG. 3, the target front end main thread functions as a conduit between the HLS main thread and a target back end main thread. FIG. 4 is a flow chart (400) illustrating high level functionality of the target back end main thread to support streaming of data from a new input source. Initially, the target back end main thread is waiting to receive the create message (402) of step (304) from the target front end main thread. In one embodiment, the communication at step (402) includes both the stream identifier and the target identifier. The target back end main thread creates space by creating an extent in the VSD and placing the addresses of relevant blocks of the extent in a table maintained at the back end of the VSD for management of input stream data (404). In one embodiment, the back end table is employed to manage blocks of data in the VSD, and an associated entry in the back end table includes an identifier for the first block of data, an identifier for the last block of data, and an identifier for an intermediate block of data from which data would be migrating. Once space for entry in the table is created, the target back end main thread sends a communication to the target front end main thread that the queues and space have been created (406). This message is received at the front end in step (308). Accordingly, the target back end thread manages details associated with blocks of data on the VSD associated with the target VSD.

Figure 5:
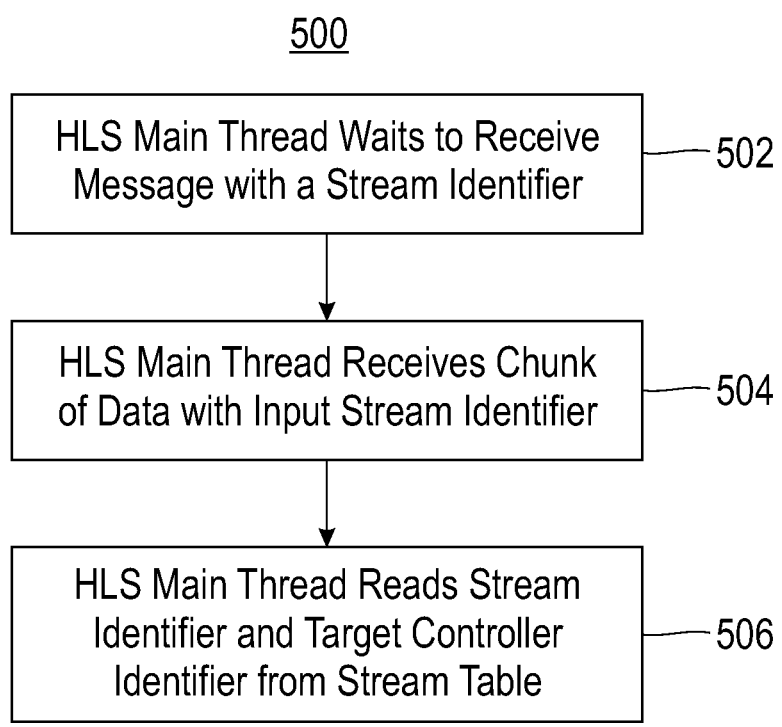
FIG. 5 is a flow chart illustrating functionality of the HLS main thread to support data transmission.

FIGS. 2-4 illustrate the process of establishing queues and communication among the VSDs and the HLS to accommodate a new data stream. Following the initializations at FIGS. 2-4, the hardware is prepared to stream data from a source to back end storage. FIG. 5 is a flow chart (500) illustrating the functionality of the HLS main thread for streaming data to back end storage. As shown, the HLS main thread waits to receive a message in an input queue with a stream identifier (502). Once the HLS main thread receives a chunk of data with the input stream identifier in the input queue (504), the HLS main thread reads the stream identifier and the target VSD identifier from the stream table (506). Following step (506), the HLS main thread knows where to stream the data. More specifically, the HLS main thread sends one or more chunks of data from the HLS output queue to the input queue of the target VSD front end (508) as identified in the stream table entry. Accordingly, with respect to streaming data to back end storage, the HLS main thread functions to search the stream table to identify the target VSD, and to direct chunks of data from the input stream to the front end of the designated VSD.

Figure 6:
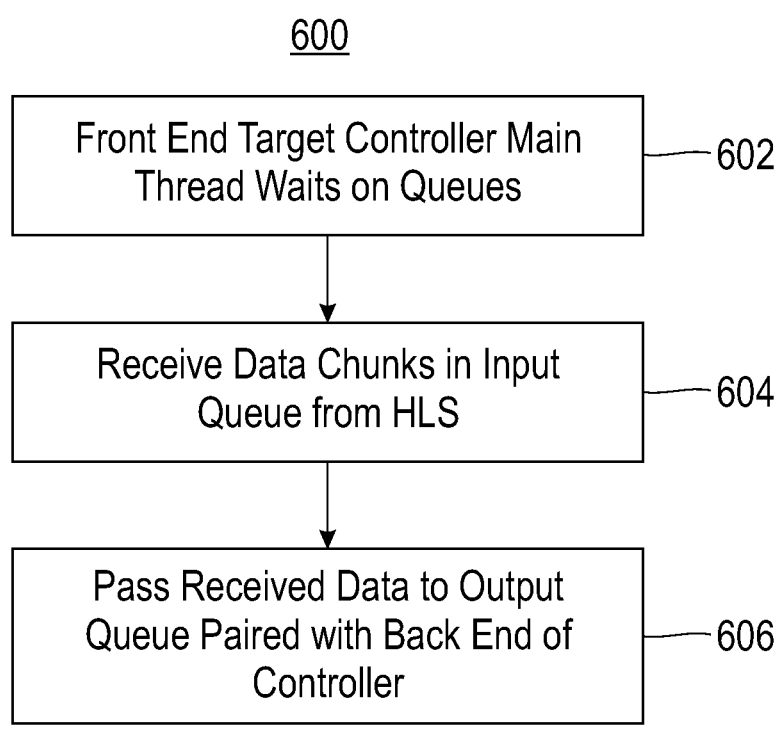
FIG. 6 is a flow chart illustrating functionality of the main thread of the front end of the designated target VSD to support data transmission.

FIG. 6 is a flow chart (600) illustrating the functionality of the main thread of the front end of the designated target VSD. This thread waits on all of its queues and functions in response to messaging in any one of its queues (602). Data is received in the input queue of the front end of the target VSD from the HLS. At step (604), the target front end main thread reads the chunks of data in the queue, as received from the HLS main thread. In one embodiment, the message in the input queue associated with the chunks of data includes the data stream identifier and the target VSD identifier. The target front end main thread passes the read data to an output queue paired with an input queue of the back end of the target VSD (606). In one embodiment, the message in the output queue being passed to the back end input queue includes the data stream identifier and the target VSD identifier. Accordingly, the target front main thread functions as a conduit between the HLS main thread and the back end of the VSD.

Figure 7:
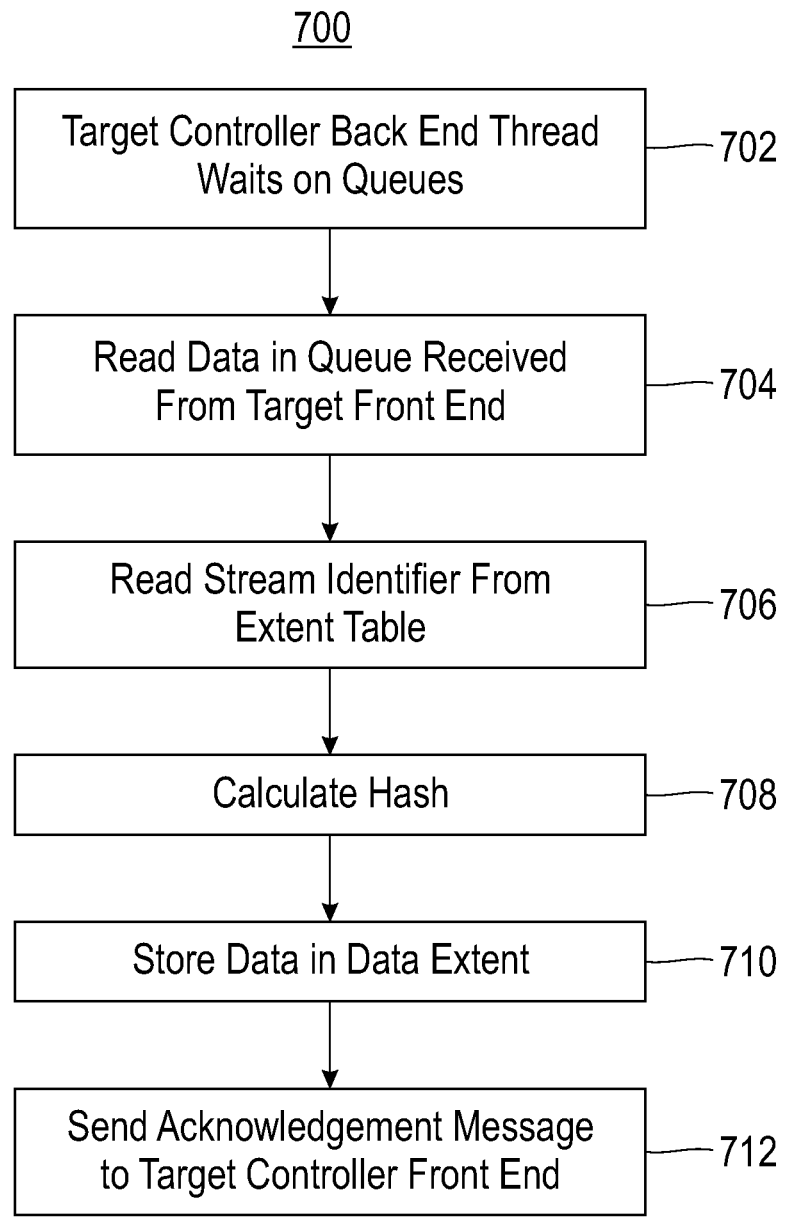
FIG. 7 is a flow chart illustrating functionality of the main thread of the back end of the target VSD to support data transmission.

FIG. 7 is a flow chart (700) illustrating the functionality of a main thread of the target VSD back end. As shown in FIG. 6, the front end of the target VSD communicates with the back end of the VSD via a set of queues. The front end of the target VSD functions as a conduit between the HLS and the back end of the target VSD. Meanwhile the back end of the target VSD functions as a conduit between the front end of the target VSD and back end storage. The main thread of the target VSD back end waits on all of its queues and functions in response to messaging in any one of its queues (702). Data is received in the input queue of the back end of the target VSD from the output queue of the front end of the target VSD. At step (704), the target back end main thread reads the blocks of data in the queue, as received from the target front end main thread. In one embodiment, the message in the input queue associated with the blocks of data includes the data stream identifier and the target VSD identifier. The target back end main thread reads a concatenation of the stream identifier and target identifier, together with pointers about data extents from an extent table (706), calculates a hash for the data blocks (708), and stores the data in a data extent (710). A data extent is an area of storage comprising linked blocks. In one embodiment, data is streamed to the data extent in back end storage in data chunks. A hash code is determined for each chunk. The hash code is used in acknowledgement to represent the data chunk to ensure that no chunk has been lost. Following storage of the data, an acknowledgement message is sent to the target front end main thread via an output queue of the target VSD back end (712). In one embodiment, the acknowledgement message at step (712) includes both the calculated hash code and the data stream identifier as arguments. Accordingly, the target back end main thread addresses writing of the data to back end storage.

Figure 8:
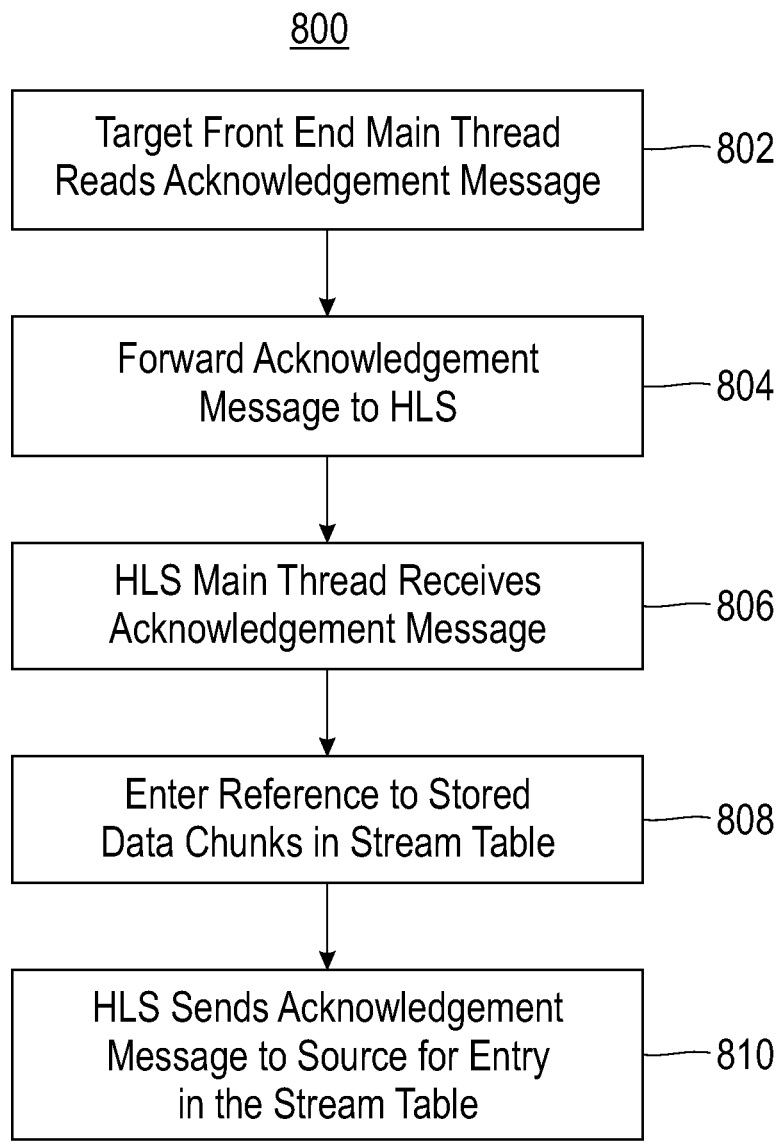
FIG. 8 is a flow chart illustrating flow of communication for transmission acknowledgement.

Once the data has been written to back end storage, messages are communicated across the hierarchy of the storage configuration. FIG. 8 is a flow chart illustrating the flow of communication. As shown in FIG. 7, the final step of the target back end main thread is to send an acknowledgement message to the target front end main thread, which reads the message from an input queue in communication with an output queue of the target VSD back end (802). In one embodiment, the read acknowledgement message includes the calculated hash and stream identifier as arguments of the message. Following step (802), the acknowledgement message is forwarded to the HLS by the target VSD front end main thread via an output queue of the target VSD front end in communication with an input queue of the HLS (804). Following receipt of the acknowledgement message in the HLS, the HLS main thread receives an acknowledgement message from the front end VSD main thread that the data has been stored in back end storage (806). In one embodiment, the HLS main thread employs the hash of the subject data chunk together with the stream identifier as arguments with the message conveyed to the source. Furthermore, in one embodiment, the HLS maintains a stream table to identify the location of the stored data chunks. In this embodiment, each entry in the stream table includes the stream identifier, the target VSD identifier, and the source (808), followed by the HLS main thread sending an acknowledgement message to the source for entry in the stream table (810), with the entry including the hash of the data chunk together with the stream identifier. Accordingly, as shown herein, streaming of data from a source to back end storage employs queues from the source to back end storage, as well as acknowledgement messages returned to the source following storage of the data chunk.

Figure 9:
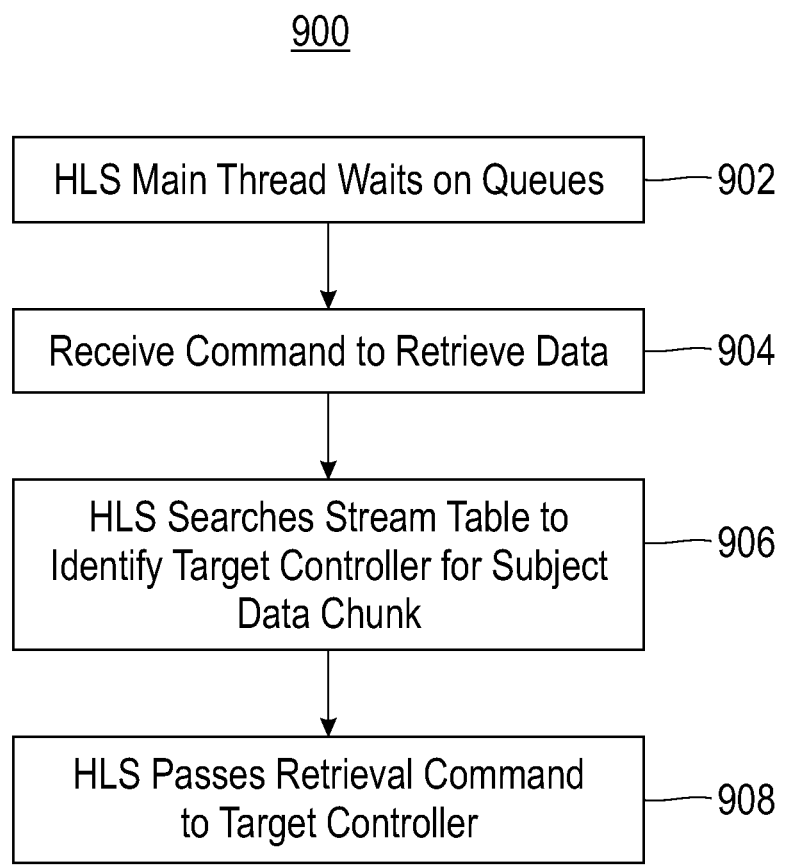
FIG. 9 is a flow chart illustrating functionality of the HLS main thread to address retrieval of stored data.

As illustrated above, a plurality of threads and queues are employed to write chunks of data from a source to back end storage. Once the data chunks have been written to back end storage, it may be necessary to retrieve the stored data. FIG. 9 is a flow chart (900) illustrating the functionality of the HLS main thread with respect to retrieving stored data. It is understood that one of the purposes of storing data is the ability to retrieve the stored data. The HLS main thread waits on all of its queues and functions in response to messaging in any one of its queues (902). With respect to data retrieval, the HLS main thread functions in response to receipt of a message in its input queue in communication with the source. Instead of data chunks, for data retrieval the HLS main thread receives a command from the source in the input queue of the HLS to retrieve data (904). In one embodiment, the command received at step (904) includes the source identifier as its argument. Following receipt of the command, the HLS main thread searches the stream table to identify the target VSD in communication with the back end storage for the subject data chunk (906). Once the target VSD has been identified, the HLS main thread passed the retrieval command from the HLS output queue to the target VSD front end input queue in communication with the HLS (908). In one embodiment, the command at step (908) includes both the source identifier and the target VSD identifier as arguments. Accordingly, with respect to retrieval of data chunks, the HLS main thread functions to identify the appropriate target VSD in communication with back end storage where the subject data chunks are located.

Figure 10:
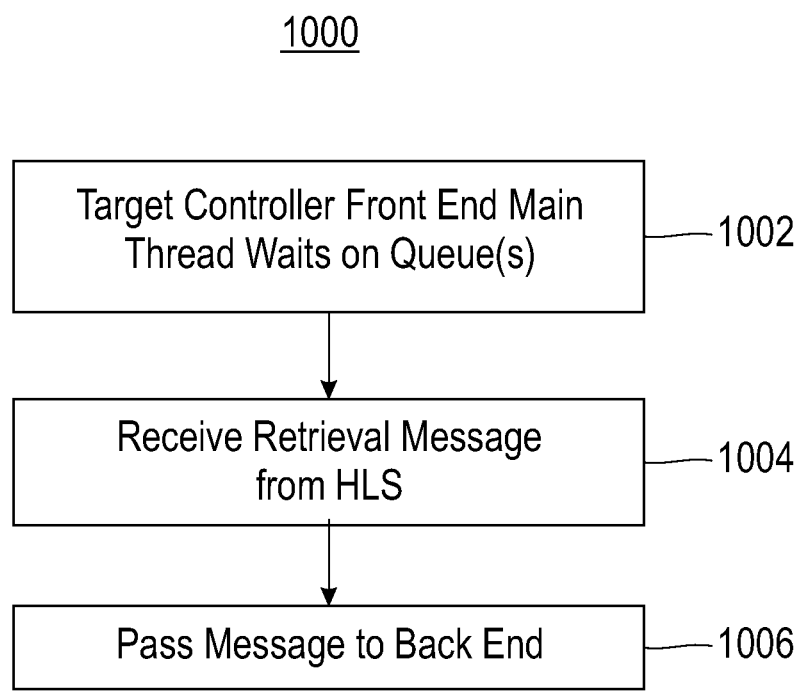
FIG. 10 is a flow chart illustrating functionality of a main thread of the target VSD front end to address retrieval of data chunks from back end storage.

FIG. 10 is a flow chart (1000) illustrating the functionality of the target VSD front end main thread for addressing retrieval of data chunks from back end storage. More specifically, the target VSD front end main thread functions as a conduit between the HLS and the back end of the target VSD. The target VSD front end main thread waits on all of its queues and functions in response to messaging in any one of its queues (1002). With respect to data retrieval, the target VSD front end main thread functions in response to receipt of a message in its input queue in communication with the HLS. Following receipt of a retrieval message from the HLS main thread (1004), the target VSD front end main thread passes the message to the target VSD back end main thread (1006). In one embodiment, the message at both steps (1004) and (1006) includes both the source identifier and the target VSD identifier as arguments of the message. Accordingly, the target VSD front end main thread functions as a conduit between the HLS main thread and the back end of the target VSD.

Figure 11:
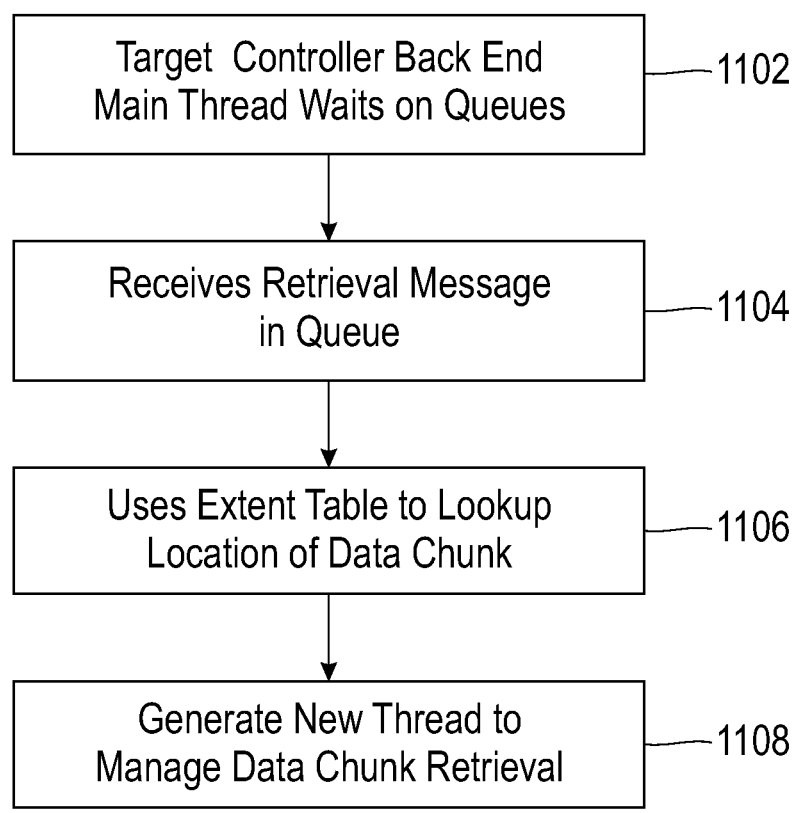
FIG. 11 is a flow chart illustrating functionality of the main thread of the target VSD back end to address retrieval of data chunks from back end storage.

FIG. 11 is a flow chart (1100) illustrating the target VSD back end main thread and how it addresses retrieval of data chunks from back end storage. The target VSD back end main thread waits on all of its queues and functions in response to messaging in any one of its queues (1102). With respect to data retrieval, the target VSD back end main thread functions in response to receipt of a retrieval message in its input queue in communication with the target VSD front end (1104). Following receipt of the retrieval message, the target VSD back end main thread uses the extent table to look up a location of the subject data chunk (1106). In one embodiment, the arguments for the extent table look up include a concatenation of the stream identifier and the target VSD identifier, and the pointers. With the data from the extent table, the target VSD back end main thread generates a new thread at the back end to manage actual retrieval of data chunks (1108). In one embodiment, the new thread ceases at the end of the retrieval. More specifically, the new thread retrieves data from a particular point and back, as there is no need to retrieve new data chunks. Accordingly, a new thread is spawned at the back end of the target VSD to facilitate data chunk retrieval from back end storage.

Figure 12:
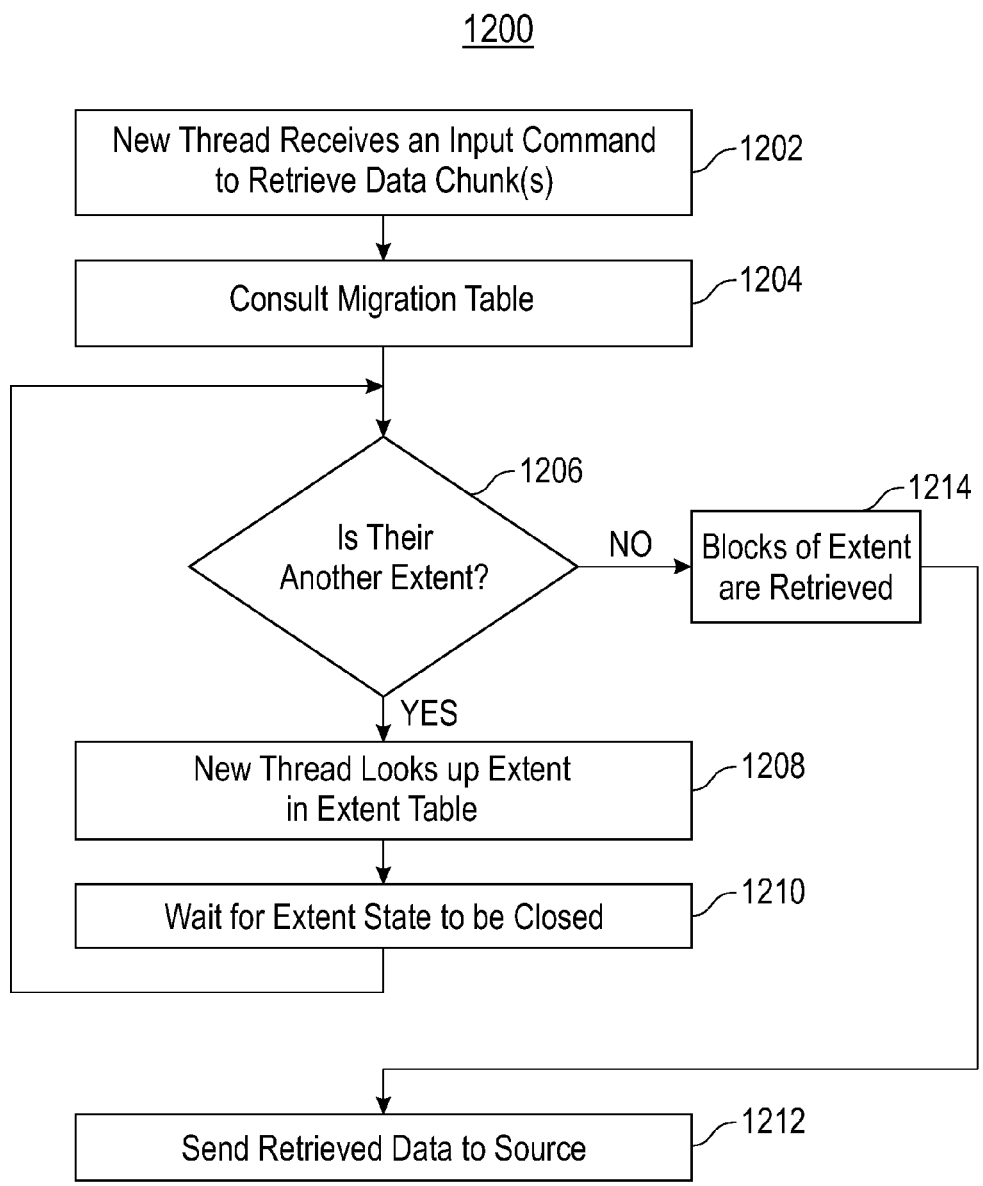
FIG. 12 is a flow chart illustrating functionality of a new thread spawned to support data retrieval from back end storage.

FIG. 12 is a flow chart (1200) illustrating the functionality of the new thread spawned for data retrieval. More specifically, the new thread receives an input command to retrieve one or more data chunks (1202). In one embodiment, the message includes a concatenation of the stream identifier and target VSD identifier, and the particular point in the data where the retrieval should end. The new thread consults a migration table at the back end to find out whether some of the requested data resides in another extent and is currently migrating from another VSD (1204). If there is another extent (1206), the new thread looks up the extent in the migration table (1208) and waits for this extent state to be closed (indicating that the migration has completed) (1210) and returns to step (1206). Conversely, if there is no other extent identified at step (1206), the blocks of the extent are retrieved (1214) in order, from the first block to the end block identified at step (1202). As each block is retrieved, the new thread sends the retrieved data back through the queues toward the source one data chunk at a time (1212). More specifically, at step (1212), the new thread sends the retrieved data chunk(s) to the target VSD front end main thread.

Figure 13:
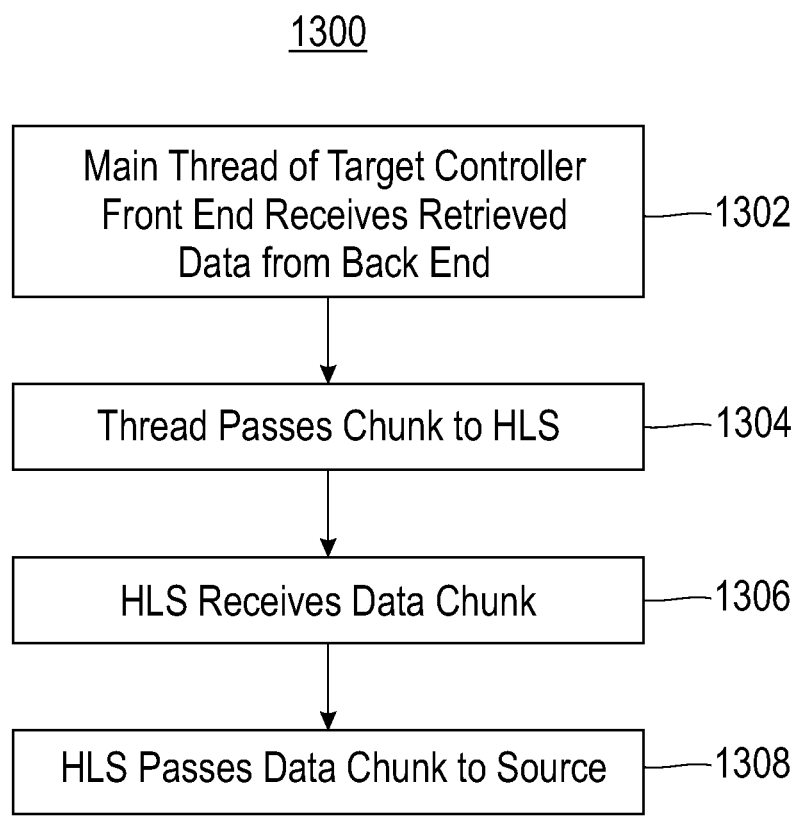
FIG. 13 is a flow chart illustrating a process for communicating one or more data chunks from the back end of a VSD to the source.

FIG. 13 is a flow chart (1300) illustrating the process in which one or more data chunks are communicated from the back end of the target VSD to the source. Following placement of a message by the new thread in the input queue of the target VSD front end, the associated main thread of the target VSD front end receives the retrieved data chunk from the target VSD back end (1302). Thereafter, the target VSD front end main thread passes the retrieved data chunk to the HLS (1304). At the HLS, the HLS main thread receives the retrieved data chunk (1306) and passes the data chunk to the source (1308). In one embodiment, the HLS main thread consults the stream table to look up the stream identifier, the target VSD identifier, and the source identifier, followed by sending the data chunk to the source.

Figure 14:
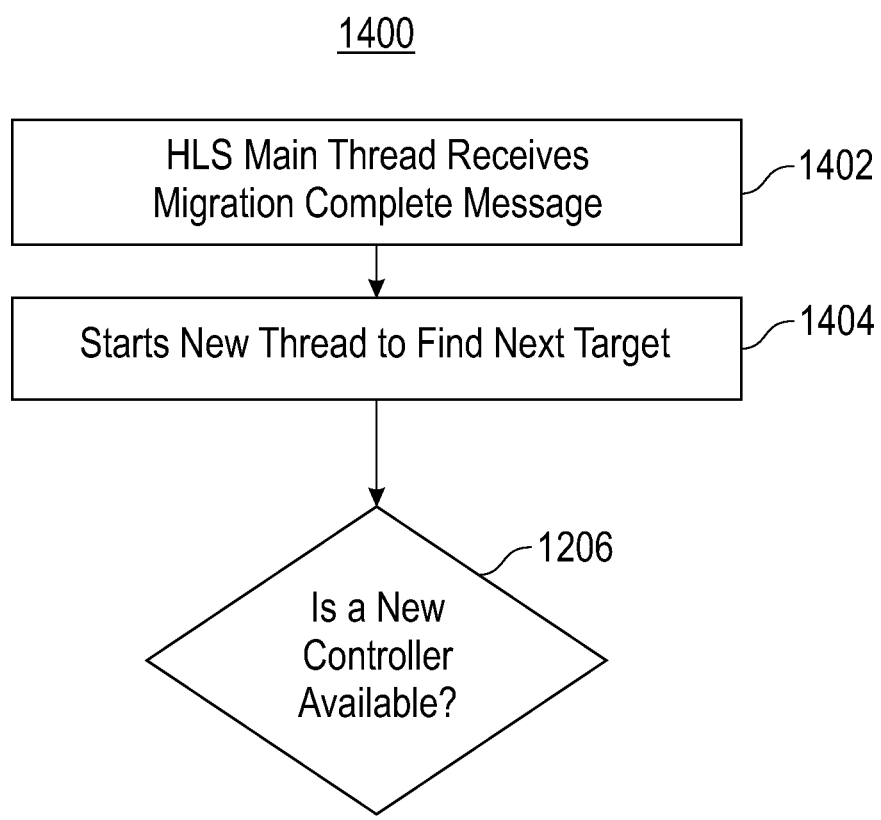
FIG. 14 is a flow chart illustrating functionality of a migration stream protocol.

Migration of data from one VSD to another VSD is driven by a backend VSD. However, the HLS is employed to select migration target VSDs. FIG. 14 is a flow chart (1400) illustrating functionality of the HLS main thread for instituting a migration protocol at the end of one migration cycle and the beginning of a second migration cycle. A migration cycle begins with a search by the HLS for a suitable next target and ends when the data has been migrated to the next target and this fact is communicated to the HLS. The HLS main thread receives a message (1402) indicating that a migration from a first VSD to a second VSD has completed. In some embodiments, the message includes identifiers for the second VSD and the stream. The HLS starts a new thread (1404) to determine if there is a new VSD available to continue the migration (1406). The action of the new HLS thread is illustrated in FIG. 15.

To facilitate migration of data among VSDs, the HLS spawns a new migration management thread as illustrated in either FIG. 2 or FIG. 14. FIG. 15 is a flow chart (1500) illustrating the functionality of the new HLS migration management thread. In one embodiment the new thread receives as input a stream identifier and the identifier of the current target VSD (1502). Once the thread is activated, the new HLS thread searches for a next target VSD for the migration (1504). In one embodiment, data is migrated from lower density storage to higher density storage. As such, one factor in the determination at step (1504) may include determining if the new VSD has higher density storage than the prior target VSD. A test at step (1506) determines whether a suitable target has been found. If a suitable new target has not been found, the migration management thread waits for a pre-specified time (1508) and returns to step (1504). When a suitable next target is found, the migration management HLS thread inserts in the stream of data a migrate command to the current target VSD to begin migration to the next target (1510). In one embodiment, the migrate command includes the stream identifier, the prior target VSD identifier, and the next target VSD identifier. Accordingly, the new migration management HLS thread is established to manage finding the next target and to initiate the migration.

Figure 16:
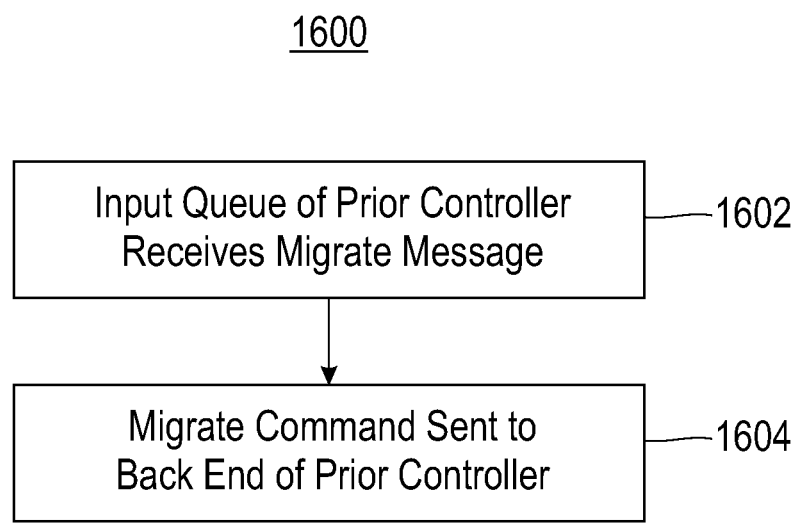
FIG. 16 is a flow chart illustrating migration of data chunks based upon functionality of the front end main thread of a prior target VSD.

Once the message at step (1510) is completed, processing of the VSD to VSD migration is set at the VSD level in the storage hierarchy. FIG. 16 is a flow chart (1600) illustrating the migration process based upon functionality of the front end main thread of the prior target VSD. More specifically, the input queue of the front end of the prior target VSD receives a migrate message from the HLS migration management thread (1602). More specifically, the message at step (1602) is sent from the HLS output queue to the front end VSD input queue to migrate data from the current target to the new target. In one embodiment, the message at step (1602) includes the stream identifier, the prior target VSD identifier, and the next target VSD identifier. Following step (1602), a migrate command is sent by the main thread of the prior target VSD front end to the output queue in communication with an input queue of the back end of the prior target VSD (1604). The migrate command instructs the back end of the prior target VSD to arrange with the back end of the new target VSD to begin migration of data.

Figure 17:
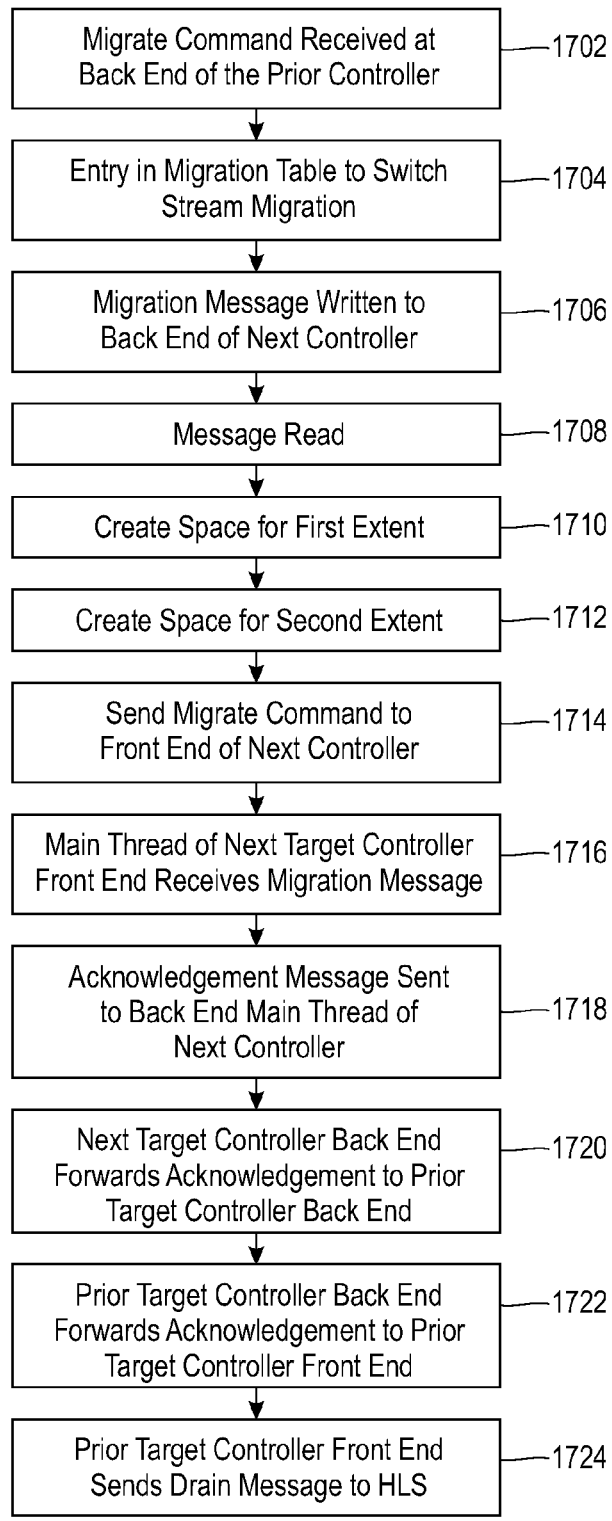
FIG. 17 is a flow chart illustrating functionality for migration processing of the target VSD back end.

FIG. 17 is a flow chart (1700) illustrating the functionality of the target back end main thread for the prior target VSD. More specifically, the migrate command sent at step (1604) is received in the input queue of the back end of the prior target VSD (1702). At the back end of the prior target VSD, an entry is made in a migration table that the migration of data is to switch stream migration from the current target VSD to the future target VSD (1704). A migration message is then written to the back end of the next target VSD (1706). In one embodiment, the respective back end main threads create the queues required to support further messaging functionality. Once the message from (1706) is read by the main thread of the back end of the next target VSD (1708), space is created by the next target VSD back end to create two data extents: a first extent (1710) for data from the data stream arriving via the new target VSD front end and a second extent for data arriving from the prior target VSD back end (1712). As shown, two data extents are maintained for the same stream, one extent receives the latest streaming data, and the other extent receives the concurrently migrating data. Following steps (1710) and (1712), a migrate command is sent to a queue between the back end and front end of the next target VSD (1714). In one embodiment, if the queues are not established, queues are created and connected at the back end between the prior and next VSDs, as well as between the back end and front end of the next target VSD. Following step (1714), the main thread of the next target VSD front end receives a migration message from the back end main thread (of the next target VSD) (1716). An acknowledgement message is then communicated from the front end main thread to the back end main thread, both of the next target VSD (1718). The acknowledgement message at step (1718) is an indication that the next target VSD is ready to receive the data stream directly from the HLS. This acknowledgement message of step (1718) is forwarded across the queues from the back end of the next target VSD to the back end of the prior target VSD (1720), and then to the front end of the prior target VSD (1722). When the communication is received by the main thread of the front end of the prior target VSD, the prior target VSD has received confirmation that the next target VSD is ready to receive data chunks associated with the migration from the prior target VSD to the next target VSD and also ready to receive the corresponding data stream directly from the HLS. The main thread of the front end of the prior target VSD then sends a drain message to the HLS main thread (1724) to communicate the change over of target VSDs.

Figure 18:
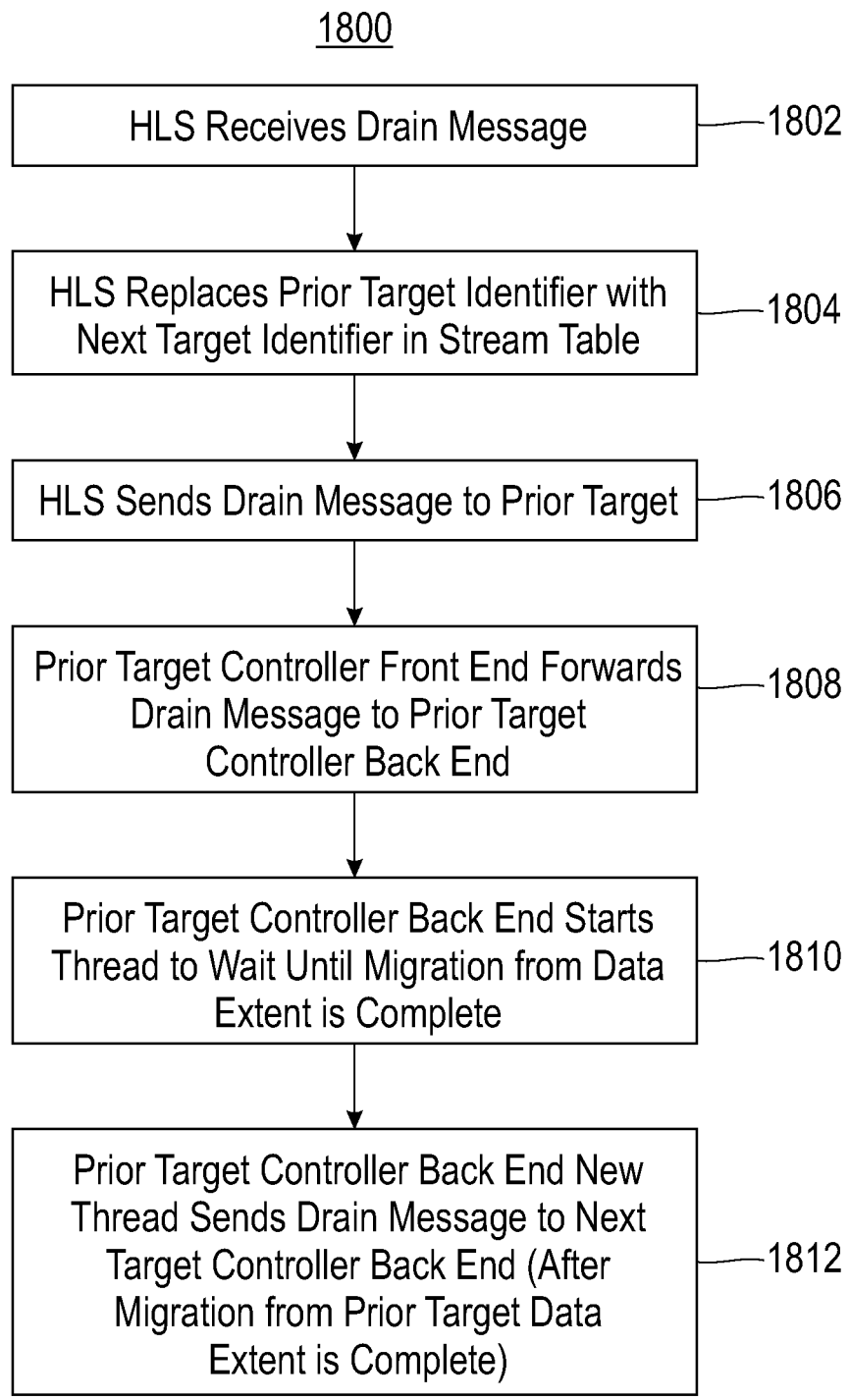
FIG. 18 is a flow chart illustrating functionality of the HLS main thread to support data migration.

A continuation of the flow of the drain message is illustrated in FIG. 18. More specifically, FIG. 18 is a flow chart (1800) illustrating the functionality of the HLS main thread for supporting inter-orbit (and inter-VSD) data migration. More specifically, FIG. 14 introduces a drain message and its associated functionality. In general, the drain message is a round-trip communication protocol between an old target VSD front end and the HLS that functions to signal a switching of target VSDs for streaming of data. The system is prepared to switch when the drain message is sent by the old target VSD front end of the HLS. Following receipt of the message, the HLS can switch direction of the streaming of data at anytime thereafter by sending the drain message to the old target VSD in place of additional data from the data stream.

As shown in FIG. 14, a new thread is activated at the HLS level in the storage system to identify the next target VSD to receive data migration from a prior target VSD. Continuing with the functionality of the drain message, the HLS main thread receives a drain message from the front end of the prior target VSD (1802). In one embodiment, the drain message employs the following arguments: the stream identifier, the prior target VSD identifier, and the next target VSD identifier. The HLS main thread replaces the prior target identifier in the stream table entry for the stream identifier with the next target identifier (1804), so that the next chunk of data from the data stream source will be forwarded to the next target VSD (see FIG. 5). Once the stream table replacement at step (1804) is complete, the HLS main thread sends a drain message to the front end main thread of the prior target VSD (1806). Accordingly, prior to completing the switch of data stream transmission to the next target VSD, the HLS main thread modifies the data in the stream table to reflect the new transmission target.

At this point, the next target VSD is ready to receive data chunks from the HLS corresponding to the data stream from the source and the HLS has sent its last such data chunk to the prior target VSD. In one embodiment, the HLS then connects its queues to queues at the next target VSD front end. When the prior target VSD front end receives the drain message, the prior target VSD front end forwards the drain message to the prior target VSD backend (1808), and, in one embodiment, removes the queues that were connected to the HLS to support communication for the stream. On receipt of the drain message, the prior target VSD back end starts a thread (1810) to wait until migration from the data extent is complete before forwarding the drain message to the next target VSD back end (1812). The action of the next target VSD back end on receipt of the drain message is illustrated in FIG. 19.

Figure 19:
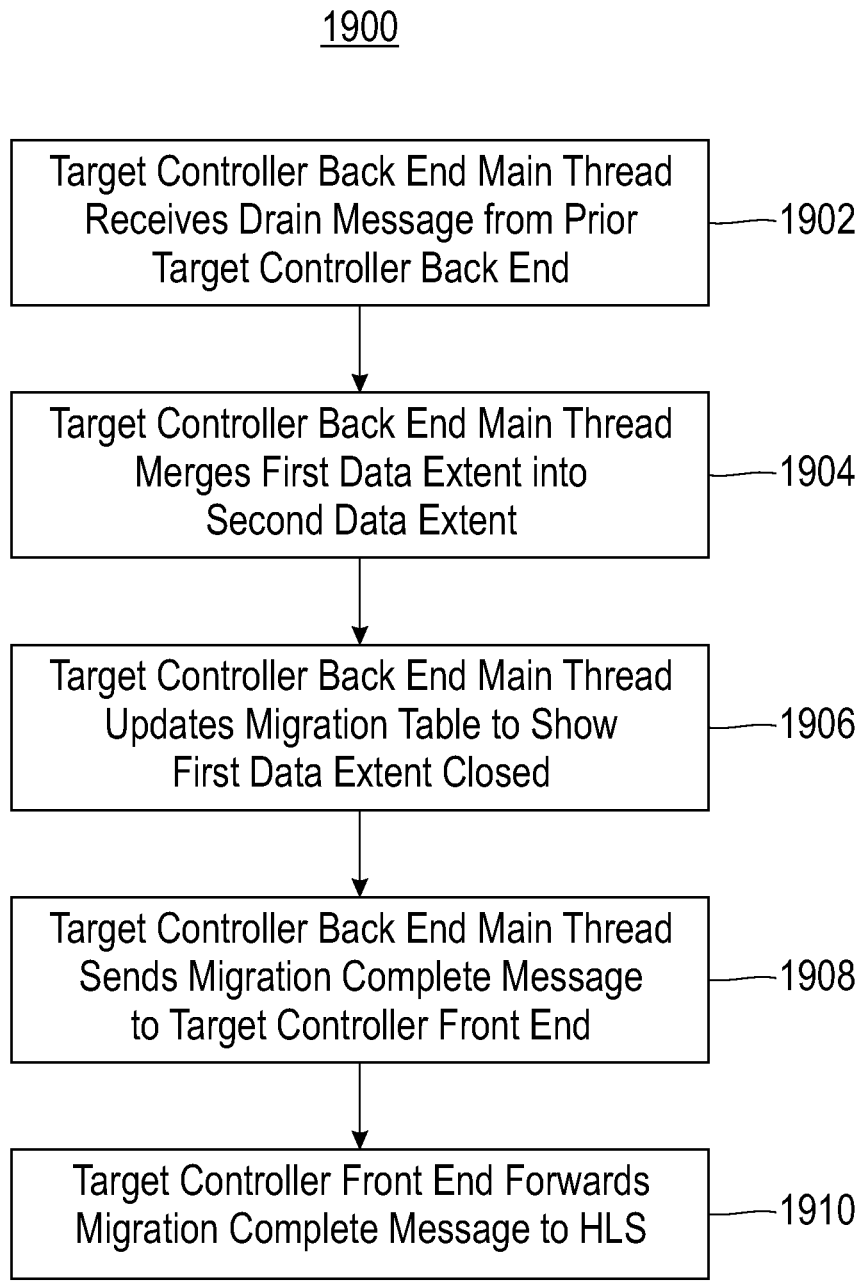
FIG. 19 is a flow chart illustrating the merging of data extents and the completion of migration processing by instructing the HLS to find a new migration target.

FIG. 19 is a flow chart (1900) illustrating completion of VSD to VSD migration from the point at which the drain message sent in step (1812) is received by the next target VSD back end (1902). The next target VSD back end main thread links the data in the first data extent reserved for data arriving from the prior target VSD back end to the data in the second data extent reserved for data being transmitted directly via the next target VSD front end by linking the last block of the first data extent to the first block of the second data extent and adjusting the entry for the second data extent in the stream table to show a new first block (the first block from the first extent) (1904). Then, the next target VSD back end main thread updates the entry in the migration table to show the first data extent closed (1906). This step completes the migration. Finally, the next target VSD back end sends a message indicating migration completion to the next target VSD front end (1908), followed by the next target VSD front end forwarding the message to the HLS (1910) to begin the next migration cycle, as illustrated in FIG. 14.

Figure 20:
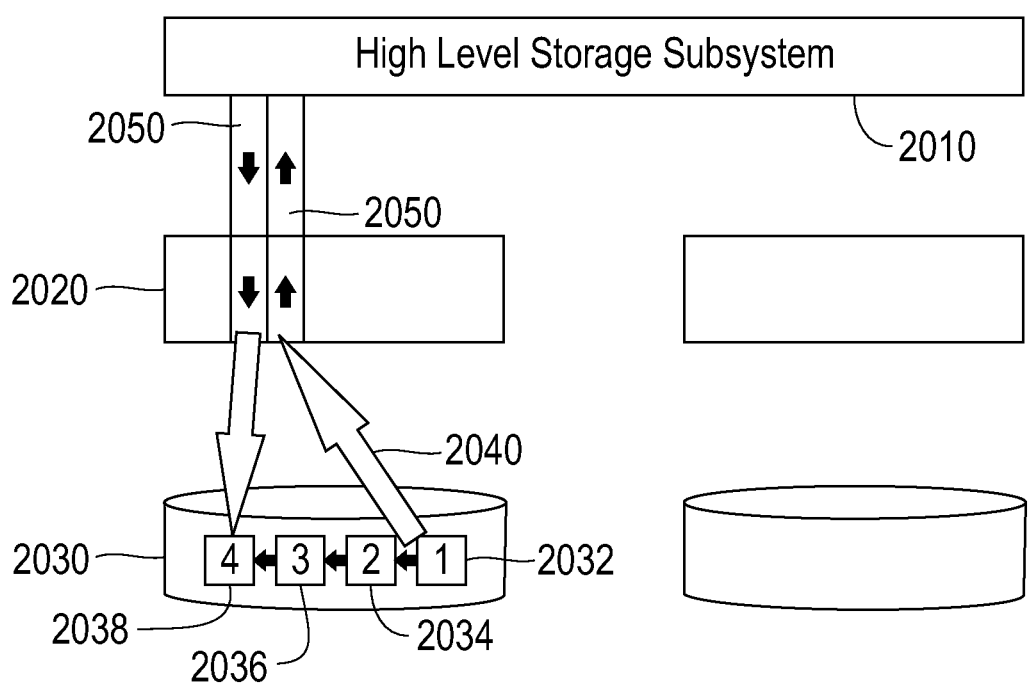
FIG. 20 is a block diagram illustrating transmission to a first target.

As demonstrated in the flow charts of FIGS. 2-19, a method is employed to support migration of data to data storage through use of a hierarchical storage system. FIG. 20 is a block diagram (2000) illustrating the manner in which data is streamed across the storage system from a source to back end storage. As shown, there is a HLS (2010) in communication with a first VSD (2020), which is in communication with a first back end storage (2030). In one embodiment, the first VSD (2020) is a RAID VSD. Data is shown streaming (2050) from the HLS (2010) into a fourth storage block (2038). Each of the blocks in the back end storage (2030) are shown chained together starting with a first storage block (2032) and ending with the fourth storage block (2038). Although only four storage blocks are shown herein, the invention should not be limited to the quantity of storage blocks shown. A pointer (2040) is retained for the first storage block (2032), which is the beginning of a data extent associated with the stream. In one embodiment, if a request for the data arrives, a task will send data beginning with the first block (2032) by way of a reverse data stream (2052). Accordingly, data is shown streaming into back end storage via the HLS and VSD while retaining the order in which data is streamed.

Figure 21:
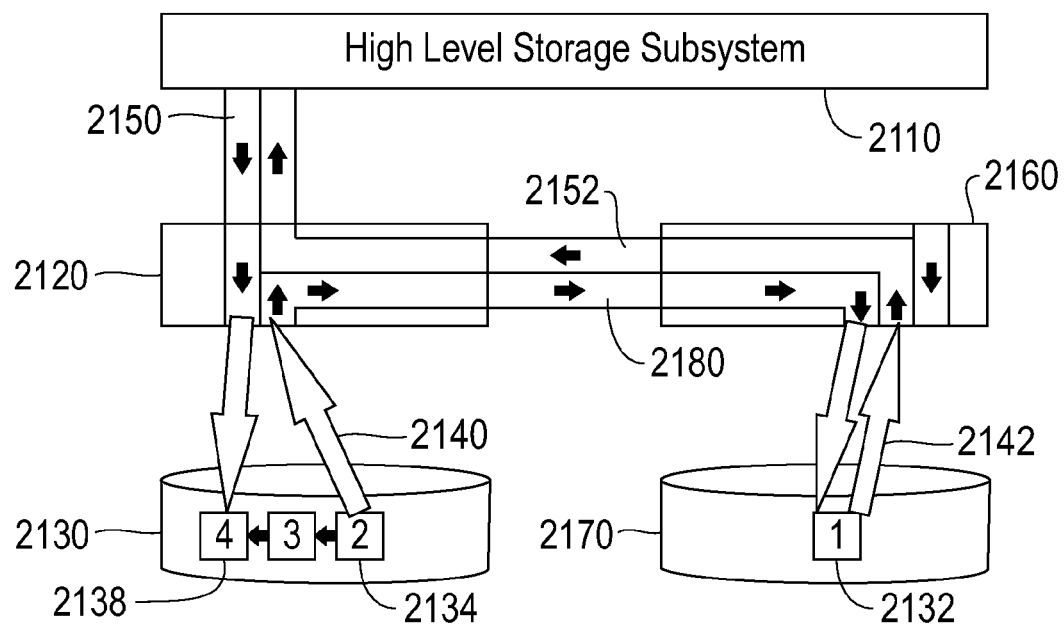
FIG. 21 is a block diagram illustrating continued transmission to the first target while initiating migration to a second target.

FIG. 21 is a block diagram (2100) illustrating the manner in which data continues to stream to a first back end storage while the first block of data is migrated to a second back end storage. More specifically, as shown, the HLS (2110) is in communication with a first VSD (2120) and a second VSD (2160). The first VSD (2120) is in communication with a first back end storage (2130), and the second VSD (2160) is in communication with a second back end storage (2170). In one embodiment, the first and second VSDs (2120) and (2160), respectively, are RAID devices. Data is shown streaming (2150) from the HLS (2110) into a fourth storage block (2138). Each of the blocks in a first back end storage (2130) are shown chained together starting with a second storage block (2134) and ending with the fourth storage block (2138). Although only four storage blocks are shown herein, three in the first back end storage (2130) and one in the second back end storage (2170), the invention should not be limited to the quantity of storage blocks shown. A pointer (2140) is retained for the second storage block (2134), which is the beginning of a data extent associated with the stream still in the first back end storage (2130). Data from a first data block (2132) has already been copied to the second back end storage (2170). At the same time, data streaming continues to fill data from the input stream into the fourth storage block (2138). In one embodiment, a fifth storage block (not shown) will chain to the fourth storage block (2138) if there is a need. While the data continues to stream to the fourth storage block (2138), data also continues to migrate to the second back end storage (2170), as shown by arrow (2180). Blocks will continue to chain to the first storage block (2132) to accommodate data from succeeding migrating blocks, and at the same time a pointer (2142) is maintained at the first storage block (2132), which is the beginning of a data extent associated with the stream. In one embodiment, if a request for the data arrives, a task will send data beginning with the first block (2132) by way of a reverse data stream (2152).

At such time as migration of a data block has completed, the first VSD (2120) sends a drain message to the HLS (2110) indicating completion of the migration to the second back end storage (2170). In return, the HLS (2110) coordinates an update of its tables tracking location of data storage and migration, and then returns the drain message on the input stream via the first VSD (2120) and moves all further input to a new data stream to the second VSD (2120).

Figure 22:
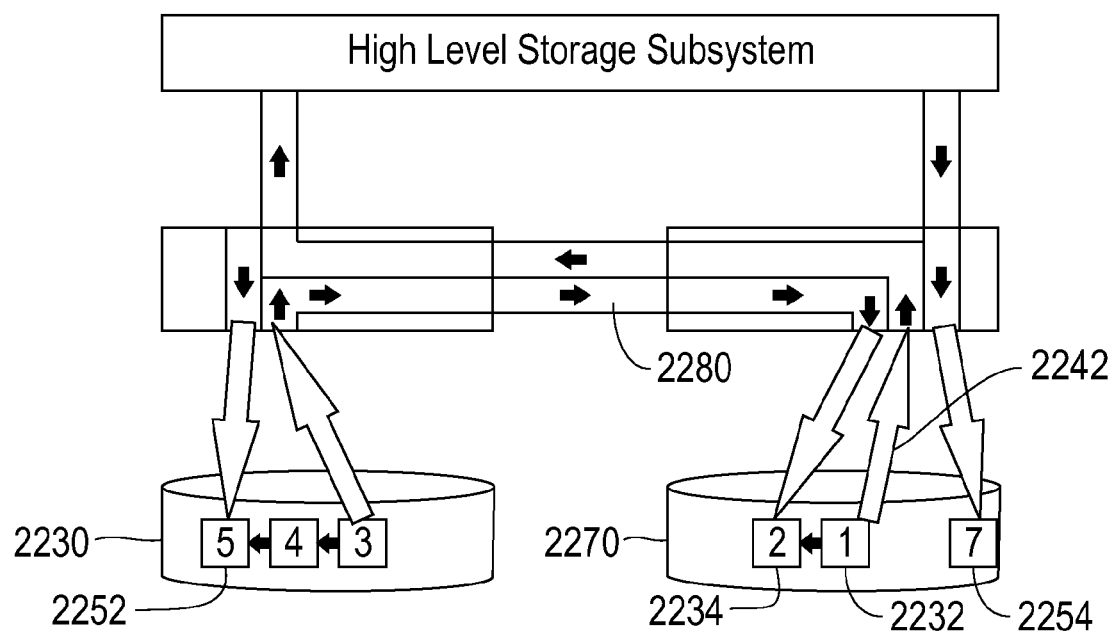
FIG. 22 is a block diagram illustrating draining an input stream to the first target, continuing migration to the second target, and re-directing transmission to the second target.

FIG. 22 is a block diagram (2200) illustrating continued streaming of data while continuing migration of data. As shown, two data blocks (2232) and (2234) have moved from the first back end storage (2230) to the second back end storage (2270). At the same time, data draining from the input stream is received at the first back end storage (2230) by a fifth storage block (2252). Data also continues to migrate to the second back end storage (2270), as shown by arrow (2280). Blocks will continue to chain to the second storage block (2234) to accommodate data from succeeding migrating blocks, and at the same time a pointer (2242) is maintained at the first storage block (2232), which is the beginning of a data extent associated with the stream. Data from the newly directed input stream is placed in a seventh storage block (2254) in the second back end storage (2270). Accordingly, draining of the input stream to the first back end storage (2230) continues while data is migrated to the second back end storage (2270) and the newly directed input stream is written to the seventh data block (2254) in the second back end storage (2270).

Figure 23:
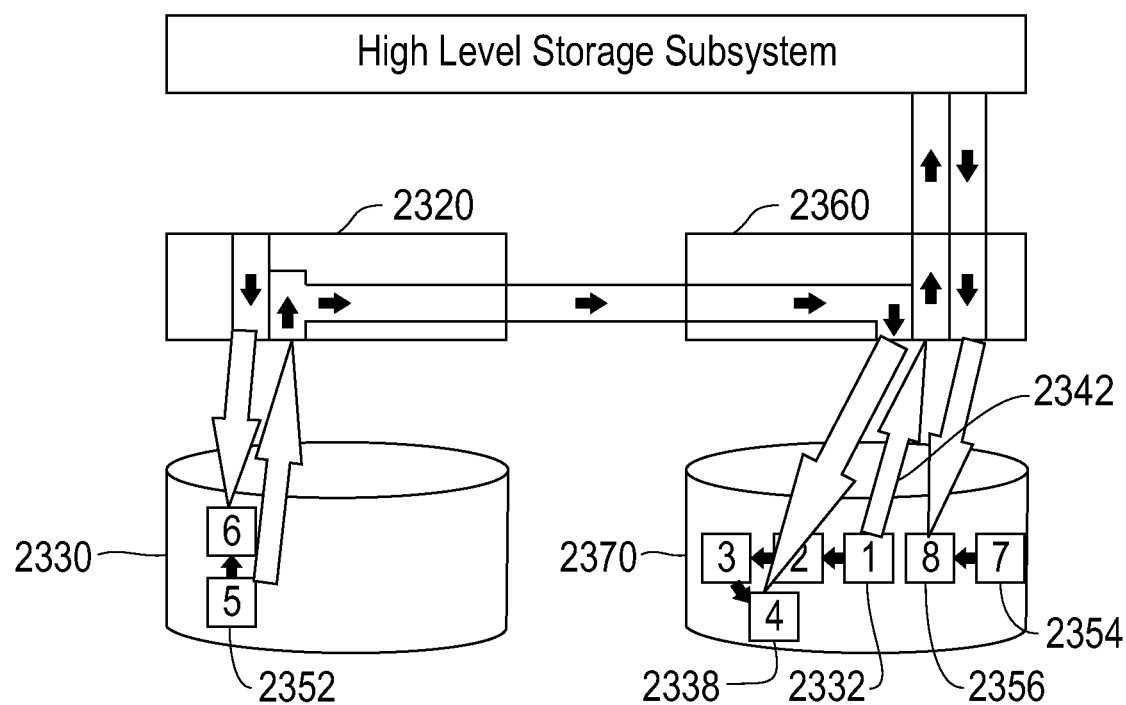
FIG. 23 is a block diagram illustrating completion of draining of the input stream while continuing migration and receiving the re-directed transmission.

FIG. 23 is a block diagram (2300) illustrating completion of migration of data from the first back end storage to the second back end storage. As shown, the fourth block of data (2338) has completed migration to the second back end storage (2370). Although the input stream has been re-directed to the second back end storage (2370), data that is still draining from the input stream is received at the first back end storage (2330). As shown, the connection of the input stream to the first storage VSD (2320) has been removed. To manage the order of the migrating data and the streaming data, a pointer is maintained at the beginning of the data extent at the first storage block (2332) and to the beginning of the seventh storage block (2354). It is also shown, that with respect to data streaming an eighth block (2356) is receiving data from the input stream and is linked to the seventh storage block (2354), and with respect to data migration the fourth data block (2338) in the second back end storage (2370) has been migrated and the fifth data block (2352) at the first back end storage (2330) is about to migrate.

Figure 24:
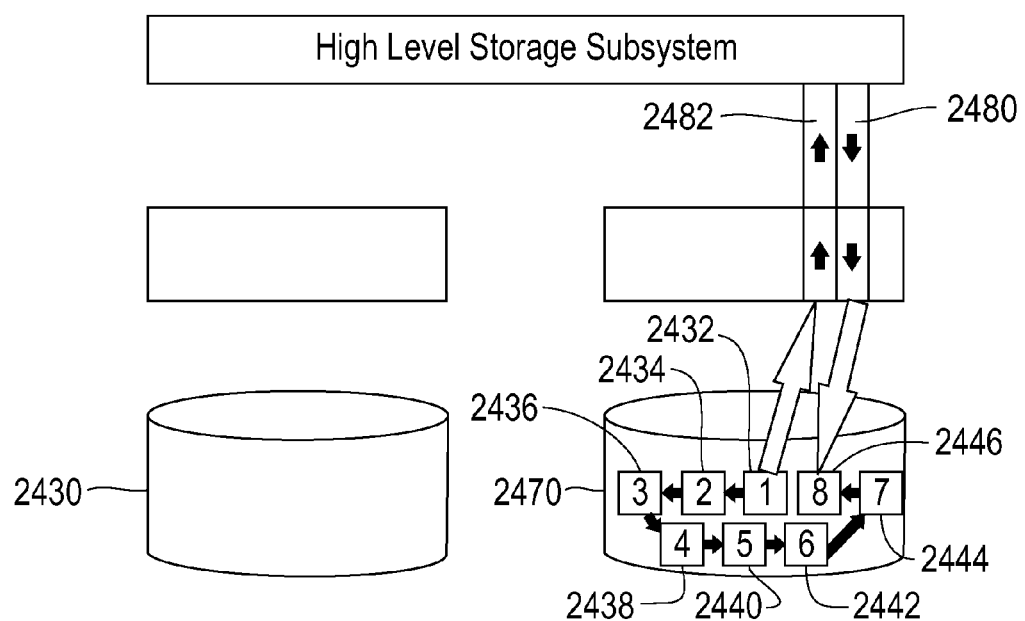
FIG. 24 is a block diagram illustrating linking of the migrated and transmitted data blocks at the second target.

FIG. 24 is a block diagram (2400) showing the linking of the streamed and migrated data blocks once the migration is completed. As shown, the first VSD (2430) does not contain any storage blocks, i.e. it is empty. The second VSD (2470) has a total of eight storage blocks (2432), (2434), (2436), (2438), (2440), (2442), (2444), and (2446). When all of the data from the first back end storage (2430) has been migrated to the second back end storage (2470), the last migrated data block (2442) from the first back end storage (2330) is linked with the seventh storage block (2444) at the second back end storage (2470) as the first streamed data block in the newly directed data stream to the second back end storage (2470). At the same time, data streaming continues as shown at (2480) with data being directed to the eighth storage block (2446). In one embodiment, if a request for the data arrives, a task will send data beginning with the first block (2432) by way of a reverse data stream (2482). Accordingly, once the linking of the last migrated storage block with the first data block of the newly directed data stream is complete, the migration is completed.

Figure 25:
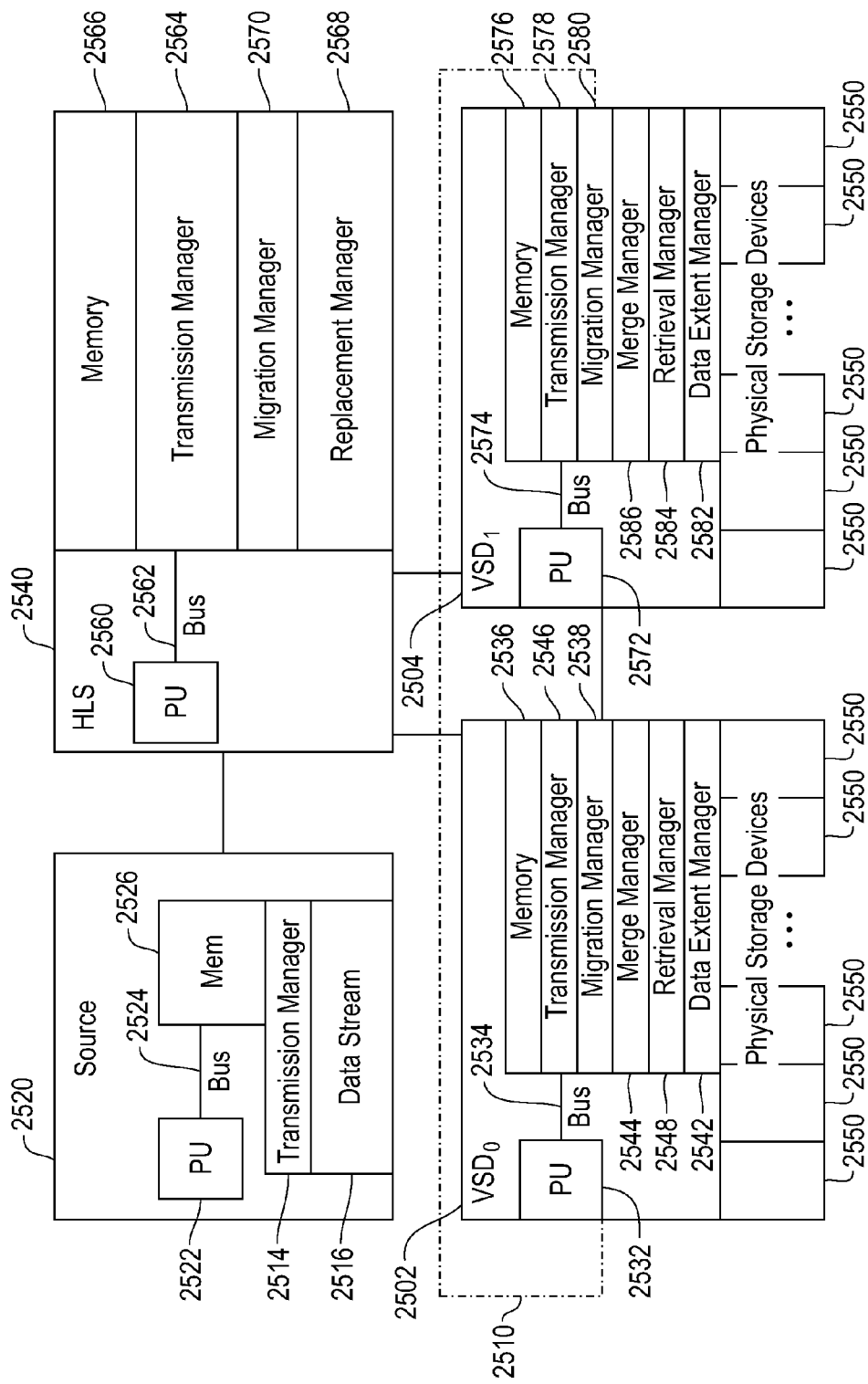
FIG. 25 is a block diagram of a computer system with tools to support migration of data between virtual storage devices, according to the preferred embodiment of this invention, and is suggested for printing on the first page of the issued patent.

As demonstrated in the flow charts of FIGS. 2-19, methods are employed to support a migration of data between VSDs. FIG. 25 is a block diagram (2500) illustrating tools embedded in a computer system to support data migration. More specifically, two VSDs (2502) and (2504) are shown in a first orbit of VSDs (2510). As described above, a VSD is a component comprising a controller and one or more physical storage devices organized in such a way as to present an interface that treats the storage as a contiguous address space of blocks. VSD (2502) is shown with physical storage devices (2550) and VSD (2504) is shown with physical storage devices (2554). The VSDs (2502) and (2504) are organized in the orbit (2510) based upon their storage density property. In one embodiment, another set of at least two VSDs may be provided in a second orbit of VSDs (not shown) with the VSDs organized in the orbit based upon their storage density property. Similarly, in one embodiment, each of orbits may be configured to include additional VSDs. Accordingly, the orbits should not be limited to the quantity of VSDs shown herein.

A source (2520) is provided in the system and in communication with the first orbit (2510). More specifically, the source (2520) includes a data stream (2516) and an transmission manager (2514) to manage migration of the data stream (2516) to one of the VSDs (2502) or (2504) in the first orbit (2510). As the source (2520) is a processor based hardware element, the source (2520) includes a processor unit (2522) in communication with memory (2526) across a bus (2524). The transmission manager (2514) functions to stream the input data stream (2516) from the source (2520) to the first VSD (2502) in an uninterrupted manner. In one embodiment, the uninterrupted manner of streaming data includes communicating the data chunks from the source to the back end VSD without having to wait on a future migration. When chunks of data are received by the first VSD (2502), they are stored therein.

The HLS (2540) is provided in the system in communication with the source (2520) and the hardware elements of the first orbit (2510). More specifically, as the HLS is a processor based hardware element, the HLS (2540) includes a processor unit (2560) in communication with memory (2566) across a bus (2562). At least three managers are provided local to the HLS (2540), including a transmission manager (2564), a migration manager (2570), and a replacement manager (2568). The transmission manager (2564) functions to process incoming transmissions and to communicate with transmission managers of the VSDs. The migration manager (2570) functions to oversee migration to the VSD. More specifically, the migration manager (2570) is notified when a data migration is completed and starts a new thread to find a new target VSD. The replacement manager (2568) to physically replace an empty VSD when the VSD has been subject to migration of all data. Details of the replacement manager (2568) are described below.

As described above, the hierarchy of the storage elements of the system includes an HLS, a VSD controller level having two or more VSDs per orbit, including a front end and a back end, and a back end virtual storage level. A first VSD (2502) at the VSD controller level of the hierarchy is provided with a migration manager (2538) that is in communication with the transmission manager (2514) of the source (2520) via the HLS (2540). As noted above, the storage system is a processor based system. The first VSD (2502) has a processing unit (2532) in communication with memory (2536) across a bus (2534). The first VSD (2502) is shown with a plurality of managers, including a transmission manager (2546), a migration manager (2538), a merge manager (2544), a retrieval manager (2548), and a data extent manager (2542). The transmission manager (2546) functions to pass through data from the source (2520) to back end storage. The migration manager (2538) functions to synchronize movement of the input stream from one VSD to another VSD and to move data from one VSD to another VSD. In one embodiment, migration of the data by the migration manager (2538) is automatic in order to ensure that data is continuously moved from a lower density VSD to a higher density VSD. As described herein, the goal of the migration is to move data from a lower density VSD to a higher density VSD. The migration manager (2538) replaces the first VSD (2502) by the second VSD (2504) as target for receipt of the input data stream (2516) while continuing data migration from the first VSD (2502) to the second VSD (2504).

The merge manager (2586) local to the second VSD (2504) functions to merge the input data stream with the migrated data in the second VSD (2504) upon completion of the data migration. Details of the functionality of the merge manager are described below. The retrieval manager (2548) addresses functionality associated with retrieving stored data. In contrast to data migration and transmission, which proceeds in a wait-free and uninterrupted manner, data retrieval waits until migration is completed so that all of the data is available for retrieval. In one embodiment, the retrieval manager ensures that blocks are retrieved in block order. As shown, a data extent manager (2542) is provided local to the VSD (2502). The data extent manager (2542) functions to maintain a source data extent (not shown) at the first VSD (2502) and a target data extent (not shown) at the target VSD (2504). Details of the functionality of the data extent manager (2542) are described below.

More specifically, the data extent manager (2542) is provided at the VSD controller level of the hierarchy. The data extent manager (2542), which is in communication with the migration manager (2538), functions to maintain a source data extent (not shown) at the first VSD (2502) and a target data extent (not shown) at the target VSD (2504). As described herein, the system includes at least two VSDs in each orbit. In an embodiment where the first VSD (2502) has a lower storage density than the second VSD (2504), during migration the second VSD (2504) is provided with two data extents. One of these data extents is configured to receive the data stream transmitted via a VSD front end, while another of these data extents is configured to receive migration data from the first VSD (2502). In some embodiments a data extent comprises linked storage blocks, each block being a contiguous fixed region of virtual storage, each block being empty, partially filled, or filled with data, and each block comprising a linking mechanism for linking with a preceding and a succeeding block. In one embodiment, a fixed block of virtual storage may correspond to multiple stripes (not necessarily contiguous regions) in the underlying physical storage devices. Accordingly, the data extent manager (2542) functions to organize and manage the order of the actual data block migration.

Data chunks are received and stored as data blocks by the second VSD (2504) from the source (2520). Data blocks are received by the second VSD (2504) from the first VSD (2502). The source (2520) provides streamed data in chunks and the first VSD (2502) provides migrating data in blocks. A merge manager (2586) is provided at the VSD controller level of the storage hierarchy. The merge manager (2586) functions to merge the data chunks from the data stream (2516) with the migrated data in the second VSD (2504) upon completion of the data migration. This merging of data includes the merge manager (2586) communicating with the data extent manager (2542) to link a final block of the receiving data extent of the second VSD (2502) with a first block of the target data extent at the second VSD (2504). In one embodiment, a merge manager (2544) is provided local to the first VSD (2502). The merge manager (2544) and (2586) only function on the receiving end of a migration. Since any VSD may become a receiving VSD for a data migration, in one embodiment every VSD is configured with a merge manager. Accordingly, in the example demonstrated herein the merge manager (2586) functions to maintain the order of data blocks based upon the original order in which they were filled from the source (2520), including managing the order of the data blocks in the data extent in the first storage (2502) as they are migrated to the second VSD (2504), as well as managing the order of data blocks in the data extent as they are filled with data received from the source (2520) by the second VSD (2504).

In one embodiment, the first orbit (2510) includes a third VSD (not shown), with the third VSD having a higher density than the second VSD (2504), which has a higher density than the first VSD (2502). The migration manager (2570) is responsible for sending a message to the third VSD (2506) in response to receipt of a message from the migration manager (2580) indicating that migration from the first VSD (2502) to the second VSD (2504) is complete.

Since data only migrates from lower to higher storage density, a lowest density VSD will never receive migration data. At the discretion of the HLS, such a lowest density VSD may be emptied of all data by forbidding its choice as an initial target for any new data stream. At such time as the data migration from a lower density VSD to a higher density VSD is complete for each data extent being maintained on the lower density VSD, the lower density VSD is empty of data. As described above, the replacement manager (2568) is provided local to the HLS (2540) and functions to physically replace an empty VSD when the VSD has been subject to migration of all data. A higher density VSD is provided to replace the empty VSD. For example, at such time as migration of data from the first VSD (2502) to the second VSD (2504) is completed and the first VSD (2502) is empty, the replacement manager (2568) may replace the first VSD (2502) with a fourth VSD (not shown), with the understanding that the storage density of the fourth VSD is greater than the densities of the first, second, and third VSDs (2502), (2504), and (not shown), respectively.

The managers and their functionality demonstrated with respect to the first VSD (2502) may be extrapolated to the second VSD (2504), and vice versa. Although two VSDs are shown in the example herein, the invention should not be limited to the quantity of VSDs, etc. In one embodiment, there may be multiple orbits provided with multiple VSDs in each orbit and cross orbit communication supported over a network connection.

As identified above, the first VSD (2502) is provided with the transmission manager (2546), migration manager (2538), merge manager (2544), retrieval manager (2548), and data extent manager (2542) to support streaming and migration of data gated by acknowledgements and systematic draining and replacement of an identified lowest density VSD. The data is streamed in data chunks from a source while previously stored data is migrated from a lower density VSD to a higher density VSD. In addition, the second VSD (2504) is provided with a processing unit (2572) in communication with memory (2576) across a bus (2574). As with the first VSD (2502), the second VSD (2504) is provided with a transmission manager (2578), a migration manager (2580), a merge manager (2586), a retrieval manager (2584). The managers are shown residing in memory local to their respective hardware element. In one embodiment, the migration managers (2538) and (2580) may reside in memory (2566) local to the HLS (2540). Although in one embodiment, the managers are shown residing in memory of their respective hardware device, the managers may selectively reside as hardware tools external to memory of their respective hardware device, or they may be implemented as a combination of hardware and software. Similarly, in one embodiment, the managers may be combined into a single functional item that incorporates the functionality of the separate items. As shown herein, each of the manager(s) are shown local to the hardware device. However, in one embodiment they may be collectively or individually distributed across the network and function as a unit to systematic data migration. Accordingly, the managers may be implemented as software tools, hardware tools, or a combination of software and hardware tools, to collect and organize data content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical VSD, a magnetic VSD, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In this document, the terms "computer program medium," "computer usable medium," and "computer readable medium" are used to generally refer to media such as main memory and secondary memory, removable storage drives, and a hard disk installed in hard disk drive.

Computer programs (also called computer control logic) are stored in main memory and/or secondary memory. Computer programs may also be received via a communication interface. Such computer programs, when run, enable the computer system to perform the features of the present invention as discussed herein. In particular, the computer programs, when run, enable the processor to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

ALTERNATIVE EMBODIMENT

It will be appreciated that, although specific embodiments of the invention have been described herein for purposes of illustration, various modifications may be made without departing from the spirit and scope of the invention. In particular, communication among the hierarchical components of the storage system is represented by queues that support data streams. These queues may be first in first out queues. In one embodiment, other mechanisms may be employed to support data streams in place of the queues, including but not limited to pipes. Accordingly, the scope of protection of this invention is limited only by the following claims and their equivalents.

We claim:
1. A method for managing streaming of data comprising:
organizing two or more data virtual storage devices (VSDs) in a first orbit in order of storage density;
streaming an input stream of data in an uninterrupted manner from a source to a first VSD in the first orbit, and storing the streamed data in the first VSD;
synchronizing movement of the input stream of data from the first VSD to a second VSD in the first orbit, including re-directing the input stream of data from the source to the second VSD, the second VSD replacing the first VSD as a receiver of the input stream of data, concurrently migrating data from the first VSD to the second VSD and draining data from the input stream at the first VSD into at least a final drained data block in the first VSD, wherein the directed input stream of data occurs in the streamed input stream after the final drained data block, and migrating the drained data stored in the first VSD to the second VSD;
maintaining a source data extent at the first VSD to support transmission before migration, and maintaining separate receiving and target data extents at the second VSD, the receiving data extent to support migration of the drained data from the first VSD and the target data extent to support transmission of the directed data; and
merging the directed data with the migrated drained data in the second VSD upon completion of the migrating of the drained data, including linking a final block of the receiving data extent of the second VSD, including the final drained data block, with a first block of the target data extent at the second VSD.

2. The method of claim 1, further comprising sending a message to a third VSD in the first orbit, said third VSD having a higher storage density than the second VSD, when migration of data from the first VSD to the second VSD is completed.

3. The method of claim 1, further comprising automatically migrating data from a lower density VSD in the first orbit to a higher density VSD in the first orbit.

4. The method of claim 1, wherein the second VSD in the first orbit is any VSD in the first orbit with a storage density greater than the first VSD.

5. The method of claim 1, further comprising replacing the first VSD in the first orbit with a higher density VSD when the first VSD is empty.

6. The method of claim 1, wherein streaming an input stream of data in an uninterrupted manner includes communication of the data without having to wait on completion of any migration operation.

7. A system comprising:
two or more virtual storage devices (VSDs) organized in a first orbit in order of storage density;
a transmission manager to stream an input stream of data in an uninterrupted manner from a source to a first VSD in the first orbit, including storage of the streamed data in the first VSD;
a migration manager in communication with the transmission manager, the migration manager to synchronize movement of the input stream of data from the first VSD to a second VSD in the first orbit, including to re-direct the input stream of data to the second VSD, to replace the first VSD by the second VSD with receipt of the input stream of data, to concurrently migrate data from the first VSD to the second VSD and to drain data from the input stream at the first VSD into at least a final drained data block in the first VSD, wherein the directed input stream of data occurs in the streamed input stream after the final drained data block, and to migrate the drained data stored in the first VSD to the second VSD;
a data extent manager in communication with the migration manager, the data extent manager to maintain a source data extent at the first VSD to support transmission before migration, and to maintain separate receiving and target data extents at the second VSD, the receiving data extent to support migration of the drained data from the first VSD and the target data extent to support transmission of the directed data; and
a merge manager to merge the directed data with the migrated drained data in the second VSD upon completion of the drained data migration, including linking a final block of the receiving data extent of the second VSD, to include the final drained data block, with a first block of the target data extent at the second VSD.

8. The system of claim 7, further comprising a message to be sent to a third VSD in the first orbit, said third VSD having a higher storage density than the second VSD, when migration of data from the first VSD to the second VSD is completed.

9. The system of claim 7, further comprising the migration manager to automatically migrate data from a lowest density VSD in the first orbit to a higher density VSD in the first orbit.

10. The system of claim 7, wherein the second VSD in the first orbit is any VSD in the first orbit with a storage density greater than the first VSD.

11. The system of claim 7, further comprising a replacement manager to replace the first VSD in the first orbit with a higher density VSD when the first VSD is empty.

12. The system of claim 7, wherein the transmission manager streaming of the input stream of data in an uninterrupted manner includes communication of the data without having to wait on completion of any migration operation.

13. A computer program product, the computer program product comprising a computer readable storage device having computer readable program code, the computer readable program code comprising:
computer readable program code configured to stream an input stream of data in an uninterrupted manner from a source to a first VSD among a plurality of VSDs in a first orbit, and storing the streamed data in the first VSD, wherein two or more VSDs in the first orbit are organized in order of storage density;
computer readable program code configured to synchronize movement of the input stream of data from the first VSD to the second VSD in the first orbit, including re-directing the input stream of data to the second VSD, the second VSD replacing the first VSD with receipt of the input stream of data, concurrently migrating data from the first VSD to the second VSD and draining data from the input stream at the first VSD into at least a final drained data block in the first VSD, wherein the directed input stream of data occurs in the streamed input stream after the final drained data block, and migrating the drained data stored in the first VSD to the second VSD;
computer readable program code configured to maintain a source data extent at the first VSD to support transmission before migration;
computer readable program code configured to maintain separate receiving and target data extents at the second VSD, the receiving data extent to support migration of the drained data from the first VSD and the target data extent to support transmission of the directed data; and
computer readable program code configured to merge the directed data with the migrated drained data in the second VSD upon completion of the migrating of the drained data, including linking a final block of the receiving data extent of the second VSD, including the final drained data block, with a first block of the target data extent at the second VSD.

14. The computer program product of claim 13, further comprising computer readable program code to send a message to a third VSD in the first orbit, said third VSD having a higher storage density than the second VSD, when migration of data from the first VSD to the second VSD is completed.

15. The computer program product of claim 13, further comprising computer readable program code to automatically migrate data from a lowest density VSD in the first orbit to a higher density VSD in the first orbit.

16. The computer program product of claim 13, wherein the second VSD in the first orbit is any VSD in the first orbit with a storage density greater than the first VSD.

17. The computer program product of claim 13, further comprising computer readable program code to replace the first VSD in the first orbit with a higher density VSD when the first VSD is empty.

18. The computer program product of claim 13, wherein the computer readable program code to stream an input stream of data in an uninterrupted manner includes communication of the data without having to wait on a future migration.

19. The method of claim 1, wherein the first orbit is a one dimensional closed loop communication path among the VSDs.